US009967711B1

(12) United States Patent
Cannings

(10) Patent No.: US 9,967,711 B1
(45) Date of Patent: May 8, 2018

(54) SYSTEMS AND METHODS FOR TRACKING A LOCATION OF AN OBJECT

(71) Applicant: Tzukuri Pty. Ltd., Kensington (AU)

(72) Inventor: William Cannings, Chippendale (AU)

(73) Assignee: Tzukuri Pty. Ltd., Kensington (AU)

( * ) Notice: Subject to any disclaimer, the term of this patent is extended or adjusted under 35 U.S.C. 154(b) by 0 days. days.

(21) Appl. No.: 15/449,842

(22) Filed: Mar. 3, 2017

(51) Int. Cl.
| H04W 4/00 | (2009.01) |
| H04W 4/02 | (2018.01) |
| H04W 24/08 | (2009.01) |
| H04B 1/3827 | (2015.01) |
| H04W 84/12 | (2009.01) |

(52) U.S. Cl.
CPC ......... *H04W 4/023* (2013.01); *H04B 1/3827* (2013.01); *H04W 24/08* (2013.01); *H04W 4/008* (2013.01); *H04W 84/12* (2013.01)

(58) Field of Classification Search
CPC ..................................................... H04W 4/023
See application file for complete search history.

(56) References Cited

PUBLICATIONS

Amidan, B. et al., "Data Outlier Detection using the Chebyshev Theorem," IEEE Aerospace Conference Proceedings, Apr. 2015.

Geurts, P. et al., "Extremely randomized trees," *Mach Learning*, Mar. 2, 2006, Springer Science + Business Media, Inc.

Kwanmuang, S., "Filtering and Tracking for a Pedestrian Dead-Reckoning System," dissertation at The University of Michigan, 2015.

Qian, J. et al., "Vector Graph Assisted Pedestrian Dead Reckoning Using an Unconstrained Smartphone," *Sensors*, Mar. 2, 2015.

Thapa, K. et al., "An Indoor Positioning Service for Bluetooth As Hoc Networks," In Proceedings of MICS, Duluth, MN, Apr. 11-12, 2003.

*Primary Examiner* — Mazda Sabouri

(74) *Attorney, Agent, or Firm* — Morgan, Lewis & Bockius LLP

(57) ABSTRACT

An attempt is made by a portable device to wirelessly detect an object. While detected, respective sweeps are executed. At a sweep, each channel in a plurality of wireless channels, sequentially pulsed during the sweep by the object, are recorded using a receiver of the device, thereby obtaining a plurality of signal measurements for the sweep. Each measurement corresponds to a channel. The measurements are filtered against measurements for corresponding channels obtained from prior sweeps, thereby obtaining filtered signal measurements for the sweep. Signal measurements that satisfy an outlier criterion are eliminated from the sweep. A measure of central tendency of the remaining filtered signal measurements is converted to a distance between the object and the device for the respective sweep using a path loss function. This is repeated for each sweep thereby determining a plurality of distances. The sweeps are aborted when the device fails to detect the object.

24 Claims, 30 Drawing Sheets

The portable computer system further comprises a magnetometer, and the method further comprises performing a second procedure, the second procedure comprising cataloging each respective location in a plurality of locations using a combination of (i) a magnetic footprint taken by the magnetometer while the portable computer system is at the respective location and (ii) a corresponding label for the respective location provided by a user of the portable computer system thereby forming a catalog of locations, receiving an identification that all or a subset of the plurality of the locations are quiet zones, and obtaining a magnetometer reading using the magnetometer on a recurring basis while the first procedure is performed.

Responsive to failing to detect the presence of the object using the wireless communication protocol, the method further comprises seeking to identify the present location of the object by comparing a most recent magnetometer reading taken by the second procedure to one or more magnetometer readings in the catalog of locations. When the present location of the object is localized, by the seeking, to a location in the catalog that is designated as a quiet zone, no warning is displayed regarding the location of the object. When the present location of the object is localized, by the seeking, to a location in the catalog that is not designated as a quiet zone, a warning is displayed regarding the location of the object. When the present location of the object is not localized, by the seeking, to a location in the catalog, a warning is displayed regarding the location of the object.

The second procedure further comprises receiving instructions from a user of the portable computer system to independently assign each quiet zone in the catalog a corresponding quiet zone period. Responsive to failing to detect the presence of the object using the wireless communication protocol, the method further comprises seeking to identify the present location of the object by comparing a most recent magnetometer reading taken by the second procedure to magnetometer readings in the catalog of locations. When the present location of the object is localized, by the seeking, to a first location in the catalog that is designated as a quiet zone within the quiet zone period for the first location, no warning is displayed regarding the location of the object. When the present location of the object is localized, by the seeking, to a first location in the catalog that is designated as a quiet zone outside the quiet zone period for the first location, a warning is displayed regarding the location of the object. When the present location of the object is localized, by the seeking, to a first location in the catalog that is not designated as a quiet zone or the attempting fails to identify the present location of the object, a warning is displayed regarding the location of the object.

| Channel | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| Sweep 1 | -63 | -63 | -64 | -64 | -64 | -65 | -67 | -68 | -70 | -71 | -76 | -83 | -87 | -81 | -77 | -77 | -74 | -75 | -77 | -74 | -75 | -79 | -83 | -104 | -83 | -80 | -75 | -72 | -71 | -69 | -68 | -68 | -68 | -70 | -71 | -73 | -72 |
| Sweep 2 | -63 | -63 | -63 | -63 | -63 | -64 | -66 | -67 | -68 | -70 | -74 | -91 | -90 | -84 | -78 | -76 | -74 | -74 | -74 | -75 | -75 | -77 | -82 | -87 | -89 | -83 | -77 | -73 | -71 | -69 | -68 | -68 | -69 | -70 | -71 | -72 | -73 |
| Sweep 3 | -64 | -63 | -63 | -63 | -63 | -64 | -66 | -67 | -68 | -70 | -74 | -87 | -100 | -85 | -78 | -77 | -74 | -74 | -74 | -74 | -75 | -77 | -82 | -86 | -92 | -83 | -77 | -52 | -72 | -70 | -69 | -69 | -69 | -70 | -71 | -73 | -74 |
| Sweep 4 | -64 | -63 | -63 | -63 | -63 | -64 | -66 | -67 | -69 | -71 | -74 | -87 | -99 | -88 | -77 | -76 | -74 | -74 | -75 | -75 | -77 | -79 | -81 | -87 | -94 | -77 | -73 | -72 | -72 | -70 | -69 | -68 | -68 | -70 | -71 | -73 | -74 |
| Sweep 5 | -64 | -64 | -64 | -64 | -64 | -65 | -67 | -68 | -69 | -71 | -74 | -76 | -83 | -80 | -81 | -76 | -75 | -74 | -74 | -75 | -77 | -79 | -82 | -94 | -84 | -77 | -75 | -73 | -71 | -68 | -68 | -69 | -70 | -69 | -71 | -72 | -74 |
| Sweep 6 | -64 | -64 | -64 | -65 | -65 | -65 | -68 | -68 | -70 | -72 | -74 | -80 | -82 | -78 | -78 | -76 | -75 | -76 | -76 | -78 | -81 | -84 | -89 | -87 | -82 | -75 | -73 | -71 | -70 | -68 | -68 | -69 | -69 | -70 | -72 | -72 | -72 |
| Sweep 7 | -65 | -65 | -65 | -65 | -65 | -66 | -67 | -70 | -72 | -73 | -76 | -77 | -80 | -76 | -74 | -74 | -74 | -74 | -77 | -74 | -76 | -79 | -83 | -84 | -79 | -76 | -73 | -71 | -70 | -68 | -69 | -68 | -69 | -70 | -71 | -71 | -72 |
| Sweep 8 | -65 | -64 | -65 | -65 | -65 | -65 | -69 | -70 | -72 | -74 | -77 | -79 | -77 | -76 | -75 | -74 | -74 | -74 | -74 | -75 | -76 | -81 | -83 | -84 | -81 | -75 | -73 | -72 | -70 | -68 | -68 | -68 | -69 | -69 | -70 | -71 | -72 |
| Sweep 9 | -65 | -64 | -65 | -65 | -65 | -65 | -68 | -70 | -72 | -74 | -77 | -82 | -77 | -76 | -75 | -73 | -74 | -73 | -74 | -75 | -76 | -79 | -82 | -84 | -79 | -76 | -74 | -71 | -70 | -69 | -68 | -68 | -70 | -69 | -70 | -71 | -71 |

…

SYSTEMS AND METHODS FOR TRACKING A LOCATION OF AN OBJECT

TECHNICAL FIELD

The present disclosure relates generally to systems and methods for tracking the location of an object, such as a pair of eyeglasses.

BACKGROUND

Approximately 3.2 billion pairs of eyeglasses were sold last year at a retail cost of 135 billion dollars. To put this into context, for every smartphone sold, more than two pairs of eyeglasses are sold. As such, eyeglasses are already the highest volume wearable in the market today. While clearly an instrumental product, eyeglasses fundamentally have not changed for over the past 100 years. Moreover, eyeglasses and other valuable objects have a drawback. They are easily misplaced. In fact, 55 million eyeglasses, collectively valued at 18 billion dollars and resulting in 90,000 tons of waste, were lost last year.

One solution for this shortcoming is to incorporate a Bluetooth distancing mechanism into objects such as eyeglasses. Such approaches are based upon Received Signal Strength Indication (RSSI) measurements. Such approaches make use of the relationship between the received signal strength and the distance. Theoretically, there exists an inverse proportional relationship between the received signal and the distance between a receiver that is trying to locate an object and the object transmitting a Bluetooth signal that can be represented linearly. In such an approach, the Bluetooth distancing mechanism reports a distance between a master device (e.g., a smart phone) and a slave device (another Bluetooth device such as eyeglasses). However, conventional Bluetooth distancing does not report very reliable distances. Various phenomena like multipath fading and shadowing make it impossible to establish a precise relationship. Bluetooth jumps between the multiple Bluetooth channels (e.g., 37 different channels) and, when there are multiple Bluetooth enabled devices in the same room that are all using the Bluetooth channels at the same time, different channels perform differently even though they are in the same environment. It is not known which channel is going to perform well in the current physical environment. As such, the distance that is reported using conventional Bluetooth distancing between a master and slave device is inaccurate and, in fact, even in instances where the master and slave device are just standing still, the reported distance using conventional Bluetooth distancing tends to jump around. Thus, conventional Bluetooth distancing does not adequately address the shortcoming in the art.

Given the above background, what is needed in the art are systems and methods for tracking the location of an object, such as a pair of eyeglasses.

SUMMARY

The present disclosure addresses the need in the art for systems and methods for tracking the location of an object, such as a pair of eyeglasses. In the present disclosure, a method for tracking an object is provided. The method comprises, at a portable computer system comprising one or more processors, a memory, a display, and a receiver, attempting (e.g., responsive to a user request at the portable computer system to locate the object.) to detect a presence of the object using a wireless communication protocol. While the attempting detects the presence of the object using the wireless communication protocol, the method further comprises performing a first procedure at each respective sweep in a plurality of sweeps.

The first procedure comprises, for a respective sweep, polling (e.g., measuring) a plurality of predetermined wireless channels sequentially pulsed by the object, using the receiver, thereby obtaining a plurality of signal measurements. In other words, the object sequentially pulses each channel in a plurality of channels (e.g., with a signal beacon) and the portable computer system polls (e.g., measures a strength) of each respective signal measurement in the plurality of signal measurements corresponding to a channel in the plurality of wireless channels during the sweep. In some embodiments, the plurality of predetermined wireless channels are Bluetooth low energy wireless channels. In some embodiments, the plurality of predetermined wireless channels are Bluetooth channels. ZigBee channels, or WiFi channels. In some embodiments, the plurality of predetermined wireless channels are Bluetooth channels. In some embodiments, the plurality of predetermined wireless channels are Bluetooth low energy wireless channels.

The first procedure further comprises filtering, for each respective predetermined wireless channel in the plurality of wireless channels, the respective signal measurement obtained in the respective sweep, against signal measurements obtained for the respective wireless channel from prior sweeps in the plurality of sweeps by the polling, thereby obtaining a plurality of filtered signal measurements. Each filtered signal measurement in the plurality of filtered signal measurements is for a corresponding wireless channel in the plurality of wireless channels.

The first procedure further comprises eliminating one or more filtered signal measurements, in the plurality of filtered signal measurements, from the plurality of filtered signal measurements when each filtered signal measurement in the one or more filtered signal measurements satisfies an outlier criterion.

The first procedure further comprises determining, after the eliminating, a first value that is representative of a measure of central tendency of the plurality of filtered signal measurements. In some such embodiments, the eliminating comprises running a Chebyshev outlier detection on the plurality of filtered signal measurements to determine whether one or more filtered signal measurements in the plurality of filtered signal measurements satisfy the outlier criterion.

The first value is converted to a distance between the object and the portable computer system for the respective sweep using a path loss function, thereby determining a plurality of distances, each distance in the plurality of distances corresponding to a sweep in the plurality of sweeps. In some such embodiments, the path loss function is:

$$RSSI = -10n\log_{10}\left(\frac{d}{d_o}\right) + A_o$$

where RSSI is the first value in units of dBm, d is the distance between the object and the portable computer system, $d_o$ is a reference distance between the object and the portable computer system, n is a propagation constant or path-loss exponent, and $A_o$ is a referenced RSSI value at $d_o$.

The first procedure is aborted when the attempting fails to detect the presence of the object using the wireless communication protocol.

In some embodiments, the method further comprises displaying the distance between the object and the portable computer system on the display determined by the first procedure at each sweep in the plurality of sweeps.

In some embodiments, the first procedure is performed while the portable computer system is in motion and the object is stationary.

In some embodiments, the portable computer system further comprises a global positioning device and, responsive to detecting the presence of the object using the wireless communication protocol, the method further comprises obtaining the global position system coordinates of the portable system and storing the global position system coordinates of the portable system as the last known global position system coordinates of the object. In some such embodiments, responsive to failing to detect the presence of the object using the wireless communication protocol, the method further comprises posting on the display a location of the object on a map that is centered based upon the last known global position system coordinates of the object. In some such embodiments, responsive to failing to detect the presence of the object using the wireless communication protocol, the method further comprises on a recurring basis calculating a distance between the portable computer system and the object using the present global position system coordinates of the portable computer system obtained using the global positioning device and the last known global position system coordinates of the object and displaying the distance.

In some embodiments, responsive to failing to detect the presence of the object using the wireless communication protocol, the method further comprises displaying a warning on the display that the object has been left behind.

In some embodiments, the portable computer system further comprises a magnetometer and the method further comprises performing a second procedure, the second procedure comprising cataloging each respective location in a plurality of locations using a combination of (i) a magnetic footprint taken by the magnetometer while the portable computer system is at the respective location and (ii) a corresponding label for the respective location provided by a user of the portable computer system thereby forming a catalog of locations. In the second procedure, an identification is received that all or a subset of the plurality of the locations are quiet zones. Further, in the second procedure, a magnetometer reading is obtained using the magnetometer on a recurring basis while the first procedure is performed.

In some such embodiments, responsive to failing to detect the presence of the object using the wireless communication protocol, the method further comprises seeking to identify the present location of the object by comparing a most recent magnetometer reading taken by the second procedure to one or more magnetometer readings in the catalog of locations. When the present location of the object is localized, by the seeking, to a location in the catalog that is designated as a quiet zone, no warning is displayed regarding the location of the object. Further, when the present location of the object is localized, by the seeking, to a location in the catalog that is not designated as a quiet zone, a warning is displayed regarding the location of the object. Further still, when the present location of the object is not localized, by the seeking, to a location in the catalog, a warning is displayed regarding the location of the object.

Alternatively, in some such embodiments, the second procedure further comprises receiving instructions from a user of the portable computer system to independently assign each quiet zone in the catalog a corresponding quiet zone period. Responsive to failing to detect the presence of the object using the wireless communication protocol, the method further comprises seeking to identify the present location of the object by comparing a most recent magnetometer reading taken by the second procedure to magnetometer readings in the catalog of locations. When the present location of the object is localized, by the seeking, to a first location in the catalog that is designated as a quiet zone within the quiet zone period for the first location, no warning is displayed regarding the location of the object. When the present location of the object is localized, by the seeking, to a first location in the catalog that is designated as a quiet zone outside the quiet zone period for the first location, a warning is displayed regarding the location of the object. When the present location of the object is localized, by the seeking, to a first location in the catalog that is not designated as a quiet zone or the attempting fails to identify the present location of the object, a warning is displayed regarding the location of the object.

In some embodiments, when the attempting discovers the presence of the object using the wireless communication protocol, the method further comprises polling the object for a battery life indication and displaying a low battery life warning on the display when the battery life indication satisfies a low battery life criterion.

In some embodiments, the portable computer system further comprises an accelerometer and a magnetometer, and the method further comprising performing a second procedure while the first procedure is being performed. In such embodiments, the second procedure comprises (i) tracking an amount of lateral movement and a direction of the lateral movement of the portable computer system between each sweep in all or a subset of the plurality of sweeps using a pedestrian dead reckoning algorithm and (ii) triangulating the amount of lateral movement and the direction of the lateral movement of the portable computer system between each sweep calculated by the tracking (i) with all or a subset of the plurality of distances to provide a corrected distance between the object and the portable computer system for a current sweep in the plurality of sweeps. In some such embodiments, the method further comprises displaying the corrected distance between the object and the portable computer system on the display determined by the second procedure at each sweep in the plurality of sweeps.

In some embodiments, the portable computer system directs the object to sequentially emit a beacon signal on each channel in the plurality of predetermined wireless channels during each sweep in the plurality of sweeps.

In some embodiments, the object is a pair of glasses.

Another aspect of the present disclosure provides a computer system, comprising, one or more processors, memory, a receiver in electrical communication with the one or more processor and one or more programs. In this aspect of the present disclosure, the one or more programs are stored in the memory and are configured to be executed by the one or more processors. Further, the one or more programs include instructions for executing any of the methods provided in the present disclosure.

Another aspect of the present disclosure provides a non-transitory computer readable storage medium and one or more computer programs embedded therein. The one or more computer programs comprise instructions, which when executed by a computer system, cause the computer system to execute any of the methods provided in the present disclosure.

BRIEF DESCRIPTION OF THE DRAWINGS

FIGS. 4A, 4B, 4C, 4D, and 4E collectively provide a flow chart of processes and features of a portable computer system for tracking the location of an object, where optional elements of the flow chart are indicated by dashed boxes, in accordance with various embodiments of the present disclosure.

FIG. 26 tabulates measured signal strength for each wireless channel in a plurality of wireless channels across a plurality sweeps in accordance with an embodiment of the present disclosure.

Like reference numerals refer to corresponding parts throughout the several views of the drawings.

DETAILED DESCRIPTION

Figure 1:
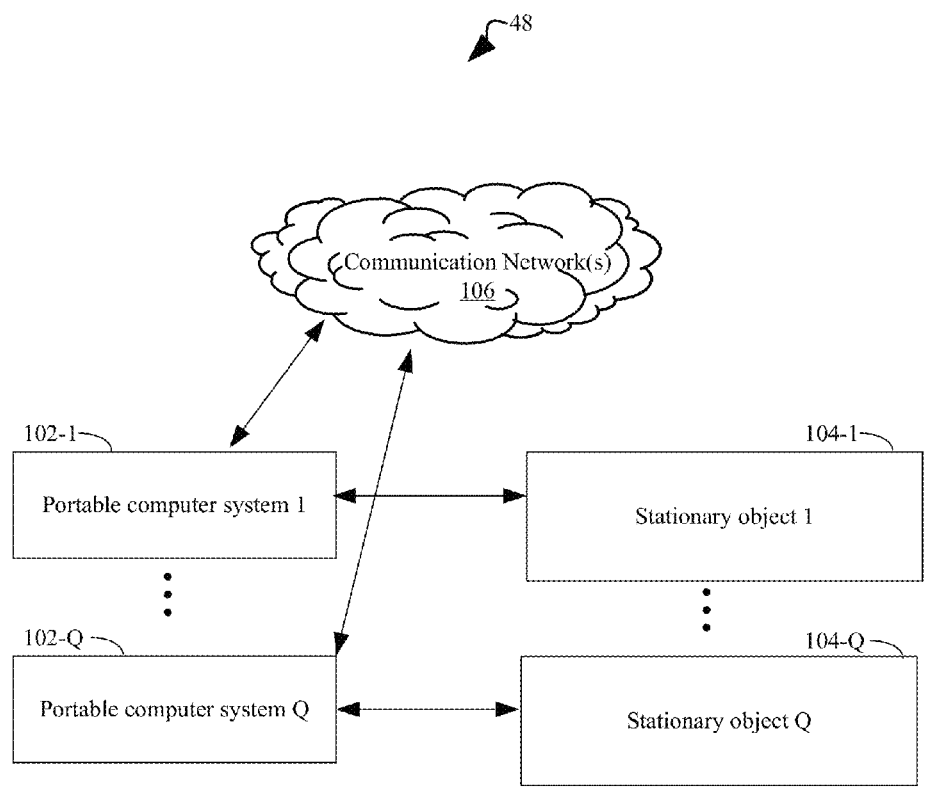
FIG. 1 illustrates an exemplary system topology that includes one or more portable computer systems for tracking the location of corresponding objects, such eyeglasses, and the objects themselves, where the above-identified components are wirelessly interconnected with each other when proximate to each other and where the portable computer systems are optionally connected to a communications network, in accordance with an embodiment of the present disclosure.

The present disclosure provides systems and methods for using a portable computing device to wirelessly detect an object (e.g., eyeglasses). While detected, respective sweeps are executed. At a sweep, each channel in a plurality of wireless channels (e.g., a plurality of Bluetooth channels) sequentially pulsed during the sweep by the object, are recorded using a receiver of the portable computing device, thereby obtaining a plurality of signal measurements for the sweep. Each measurement corresponds to a channel. The measurements are filtered against measurements for corresponding channels obtained from prior sweeps, thereby obtaining filtered signal measurements for the sweep. Signal measurements that satisfy an outlier criterion are eliminated from the sweep. A measure of central tendency of the remaining filtered signal measurements is converted to a distance between the object and the portable computing device for the respective sweep using a path loss function. This is repeated for each sweep thereby determining a plurality of distances. The sweeps are aborted when the device fails to detect the object. For instance, in the case where the plurality of wireless channels are Bluetooth channels, one embodiment of the present disclosure scans the entire Bluetooth spectrum, dynamically selected frequencies that show no interference. The signal strength of these frequencies are turned into a stable and accurate distance.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 2:
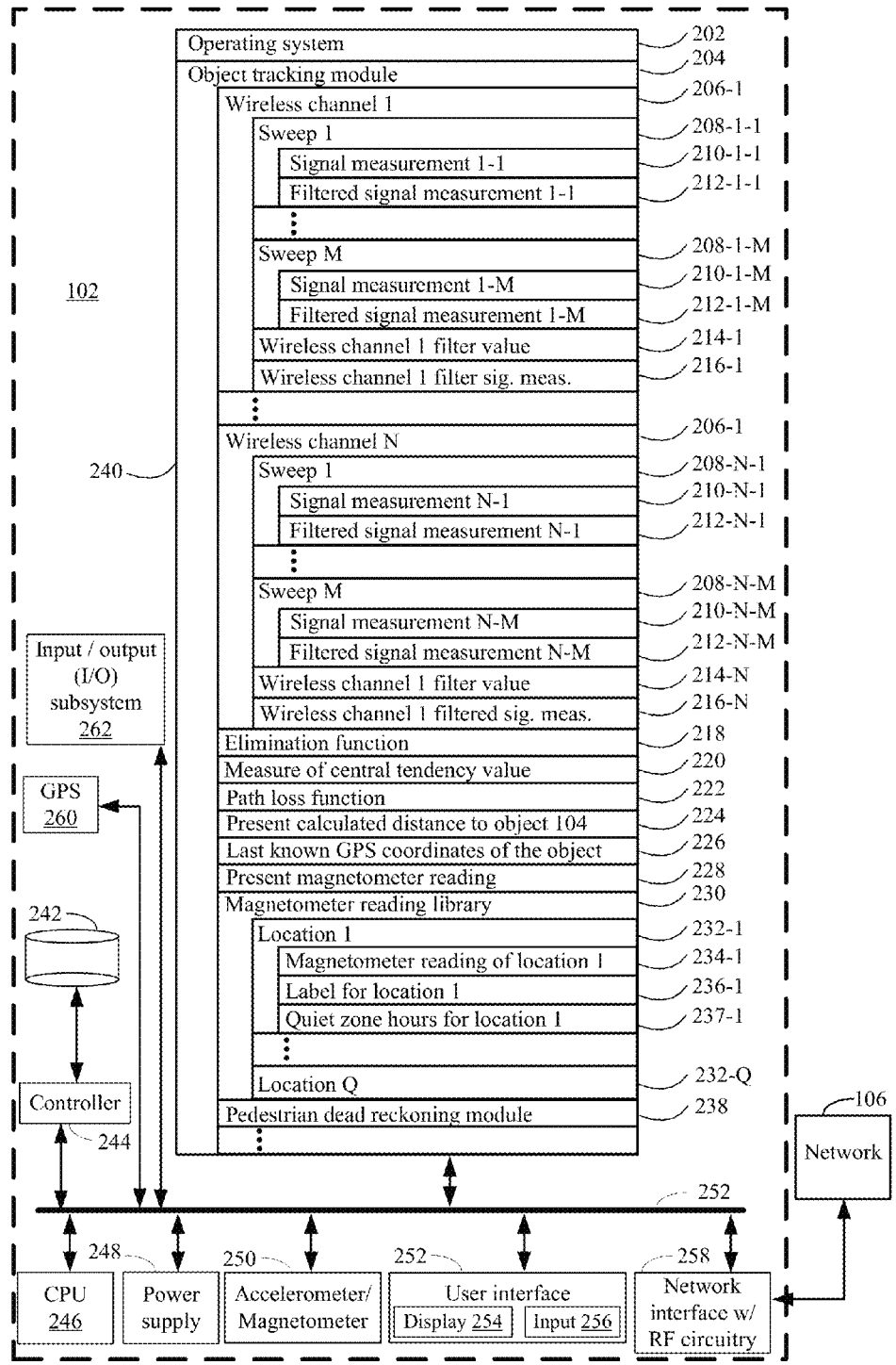
FIG. 2 illustrates a portable computer system for tracking the location of an object, such as a pair of eyeglasses, in accordance with an embodiment of the present disclosure.
Figure 3:
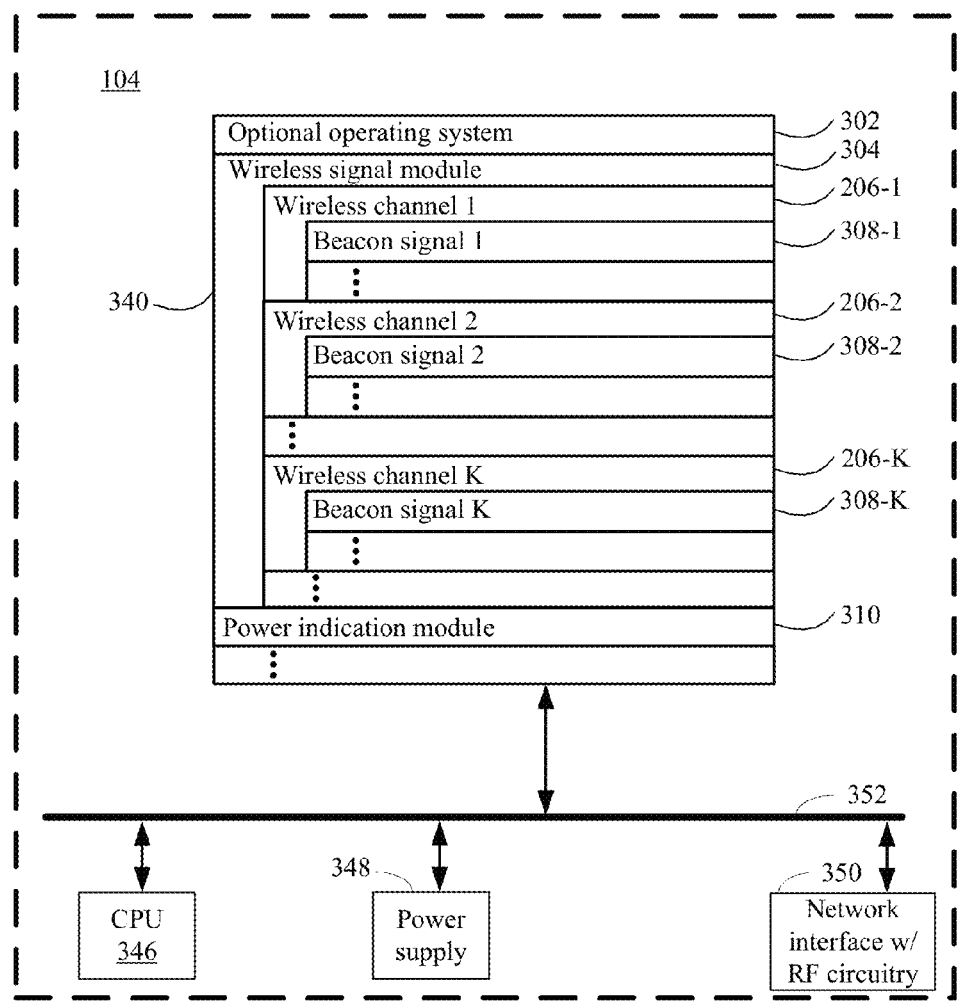
FIG. 3 illustrates an object that is tracked by a portable computer system in accordance with an embodiment of the present disclosure.

A detailed description of a system 48 for tracking an object in accordance with the present disclosure is described in conjunction with FIGS. 1 through 3. As such, FIGS. 1 through 3 collectively illustrate the topology of the system in accordance with the present disclosure. In the topology, there are one or more portable computer systems 102 (e.g., smartphones) for tracking an object and one or more objects 104 that are being tracked. Referring to FIG. 1, each portable computer system 102 is paired to a particular stationary object 104 (e.g., using conventional Bluetooth pairing). In some embodiments, each portable computer system 102 is paired to more than one stationary object 104. When a portable computer system 102 and an object paired with the portable computer system are proximate to each other, the disclosed location algorithms enable the portable computer system 102 to locate the paired object.

In some embodiments, each portable computer system is wirelessly connected to a communications network 106 in order to obtain data such as street maps that are used in some embodiments of the present disclosure. Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication between the portable computer systems 106 and the communication network in such embodiments optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.1 lax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 48 are possible. For instance, in some embodiments, portable computer systems 102 do not rely on the communications network for data in order to locate objects 104. Moreover, in some embodiments, a stationary object 104 is paired with more than one portable computer system 102. In some embodiments, as discussed above but not shown in FIG. 1, a particular portable computer system is paired with more than one stationary object 104. As such, the exemplary topology shown in FIG. 1 merely serves to describe the features of an embodiment of the present disclosure in a manner that will be readily understood to one of skill in the art.

Referring to FIG. 2, in typical embodiments, the regimen adjustment device 250 comprises one or more computers. For purposes of illustration in FIG. 2, the regimen adjustment device 250 is represented as a single computer that includes all of the functionality for adjusting a basal/bolus ratio in a standing insulin regimen for a subject. However, the disclosure is not so limited. In some embodiments, the functionality for adjusting a basal/bolus ratio in a standing insulin regimen for a subject is spread across any number of networked computers and/or resides on each of several networked computers and/or is hosted on one or more virtual machines at a remote location accessible across the communications network 106. One of skill in the art will appreciate that any of a wide array of different computer topologies are used for the application and all such topologies are within the scope of the present disclosure.

Turning to FIG. 2 with the foregoing in mind, an exemplary portable computer system 102 for tracking an object 10 comprises one or more processing units (CPUs) 246, a network or other communications interface 258, a memory 240/242 (e.g., random access memory 240 and persistent memory 242 coupled to the random access memory by a controller 244), a user interface 252, the user interface 252 including a display 254 and input 256 (e.g., keyboard, keypad, touch screen), an optional accelerometer and/or magnetometer 250, an optional GPS 260, an input/output (I/O) subsystem 262, one or more communication busses 253 for interconnecting the aforementioned components, and a power supply 248 for powering the aforementioned components.

In some embodiments, the input 256 is a touch-sensitive display, such as a touch-sensitive surface. In some embodiments, the user interface 252 includes one or more soft keyboard embodiments. The soft keyboard embodiments may include standard (QWERTY) and/or non-standard configurations of symbols on the displayed icons.

In some embodiments, the portable computer system illustrated in FIG. 2 optionally includes one or more accelerometer and one or more magnetometers. In some embodiments, the portable computer system illustrated in FIG. 2 includes a global positioning system (or GLONASS or other global navigation system) receiver 260 for obtaining information concerning the location and orientation (e.g., portrait or landscape) of portable computer system 102.

It should be appreciated that the portable computer system 102 illustrated in FIG. 2 is only one example of a multi-function device that may be used for tracking an object 104, and that the portable computer system 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Memory 240 of the portable computer system 102 illustrated in FIG. 2 optionally includes high-speed random access memory and optionally also includes non-volatile memory, such as one or more magnetic disk storage devices (e.g. optional storage devices 242), flash memory devices, or other non-volatile solid-state memory devices. Access to memory 242 by other components of the portable computer system 102, such as CPU(s) 246 is, optionally, controlled by the memory controller 244.

In some embodiments, the memory 240 of the portable computer system 102 illustrated in FIG. 2 stores:
 an operating system 202 that includes procedures for handling various basic system services;
 an object tracking module 204, the object tracking module tracking signal measurements 210 and filtered signal measurements 212 for a plurality of wireless channels 206 across a plurality of sweeps 208;
 an elimination function for 218 for discarding outlier filtered signal measurements 212 in any given sweep using the corresponding wireless channel filter values 214 for each given channel 206 to thereby obtain a present wireless channel 1 filtered signal measurement 216 for each given channel 206;
 a measure of central tendency value for last sweep 208 that is computed from the wireless channel filtered signal measurement 216 of each wireless channel 206;
 a path loss function 222 for converting the measure of central tendency value 220 to a present calculated distance 224 between the portable computer system; 102 and the object;
 the last known GPS coordinates 226 to the object 226;
 a present magnetometer reading 228 of the portable computer system 102;
 a magnetometer reading library 230 that includes, for each respective location 232, a magnetometer reading of the location 234, a label for the location 236 (e.g., provided by the user of the portable computer system 102), and optional quiet zone hours for the location 237; and
 a pedestrian dead reckoning module 238 for locating the object 104.

In some embodiments, the portable computer system includes a peripherals interface (not shown in FIG. 2). The peripherals interface can be used to couple input and output peripherals of the device to CPU(s) 246 and memory 240/242. The one or more processors 246 run or execute various software programs and/or sets of instructions stored in memory 240/242, such as the object tracking module 204, to perform various functions for the portable computer system 102 and to process data.

In some embodiments, the peripherals interface, CPU(s) 246, and memory controller 244 are, optionally, implemented on a single chip. In some other embodiments, they are implemented on separate chips.

RF (radio frequency) circuitry of the network interface 258 receives and sends RF signals, also called electromagnetic signals. In some embodiments, beacons emitted by the object 104 on each of the wireless channels 206 are received by the object tracking module 204 using this RF circuitry. In some embodiments, the RF circuitry 258 converts electrical signals to/from electromagnetic signals and communicates with communications networks 106 and other communications devices and/or the object 104 via the electromagnetic signals. For instance, in some embodiments, the RF circuitry, under the direction of the object tracking module, directs the object 104 to beginning a beacon process in which the object sequentially emits a beacon on each channel 206 in the plurality of channels as part of a sweep 208. The RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. In some embodiments, the RF circuitry 258 communicates with the communication network 106.

In some embodiments the portable computer system comprises audio circuitry, a speaker and/or a microphone (not shown). In some such embodiments, the audio circuitry, the optional speaker, and the optional microphone provide an audio interface between a user of the portable computer system 102 and the object tracking module 204. In such embodiments, the audio circuitry receives audio data from a peripherals interface, converts the audio data to electrical signals, and transmits the electrical signals to the speaker. The speaker converts the electrical signals to human-audible sound waves. The audio circuitry also receives electrical signals converted by the microphone from sound waves. The audio circuitry converts the electrical signal to audio data and transmits the audio data to peripherals interface for processing. Audio data is, optionally, retrieved from and/or transmitted to the memory 240/242 and/or the RF circuitry by the peripherals interface.

In some embodiments, the power supply 248 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the portable computer system 102 optionally also includes one or more optical sensors (not shown in FIG. 2). The optical sensor(s) optionally include charge-coupled device (CCD) or complementary metal-oxide semiconductor (CMOS) phototransistors. The optical sensor(s) receive light from the environment, projected through one or more lens, and converts the light to data representing an image. The optical sensor(s) optionally capture still images and/or video. In some embodiments, an optical sensor is located on the back of the portable computer system 102, opposite the display 254 on the front of the portable computer system 102, so that the input 256 is enabled for use as a viewfinder for still and/or video image acquisition. In some embodiments, another optical sensor is located on the front of the portable computer system 102 so that a user's image is obtained (e.g., to verify the identity of the subject, etc.).

As illustrated in FIG. 2, a portable computer system 102 preferably comprises an operating system 202 that includes procedures for handling various basic system services. The operating system 202 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

In some embodiments the portable computer system 102 is a smart phone. In other embodiments, the portable computer system 102 is not a smart phone but rather is a tablet or other form of wireless networked device. In some embodiments, the portable computer system 102 has any or all of the circuitry, hardware components, and software components found in the portable computer system depicted in FIG. 2. In the interest of brevity and clarity, only a few of the possible components of the portable computer system 102 are shown in order to better emphasize the additional software modules that are installed on the portable computer system 102.

In some embodiments, the object tracking module 202 is accessible within any browser (phone, tablet, laptop). In some embodiments the object tracking module 202 runs on a native device frameworks and/or is available for download onto the portable computer system 102 running an operating system 202 such as Android or iOS.

In some implementations, one or more of the above identified data elements or modules of the portable computer system 102 are stored in one or more of the previously described memory devices, and correspond to a set of instructions for performing a function described above. The above-identified data, modules or programs (e.g., sets of instructions) need not be implemented as separate software programs, procedures or modules, and thus various subsets of these modules may be combined or otherwise re-arranged in various implementations. In some implementations, the memory 340/342 optionally stores a subset of the modules and data structures identified above. Furthermore, in some embodiments, the memory 340/342 stores additional modules and data structures not described above.

Referring to FIG. 3, in typical embodiments, the object, such as eyeglasses, comprises one or more processing units (CPUs) 346, a communications interface 350, a memory 340 (e.g., random access memory, one or more magnetic disk storage, and/or persistent devices optionally accessed by one or more controllers), one or more communication busses 352 for interconnecting the aforementioned components, and a power supply 348 (e.g., a battery) for powering the aforementioned components. In some embodiments, data in memory 340 is seamlessly shared between volatile (non-persistent) and non-volatile (persistent) memory using known computing techniques such as caching.

In some embodiments, the memory 340 of the object 104 comprises:
  an operating system 304 that includes procedures for handling various basic system services;
  a wireless signal module 304 for emitting a beacon signal 308 on each wireless channel 206 in a plurality of wireless channels; and
  a power indication module 348 for interrogating the status of the power supply 348.

In some implementations, one or more of the above identified data elements or modules of object 104 are stored in one or more of the previously described memory devices, and correspond to a set of instructions for performing a function described above. The above-identified data, modules or programs (e.g., sets of instructions) need not be implemented as separate software programs, procedures or modules, and thus various subsets of these modules may be combined or otherwise re-arranged in various implementations. In some implementations, the memory 340 optionally stores a subset of the modules and data structures identified above. Furthermore, in some embodiments, the memory 340 stores additional modules and data structures not described above.

In some embodiments, the portable computer system 102 for tracking an object 104 is a smart phone (e.g., an iPHONE), laptop, tablet computer, or other form of electronic device (e.g., a gaming console) and is mobile.

Now that details of a system 48 for tracking an object 104 using a portable computer system 102 has been disclosed, details regarding a flow chart of processes and features of the system, in accordance with an embodiment of the present disclosure, are disclosed with reference to FIGS. 4A through 4E. In some embodiments, such processes and features of the system are carried out by the object tracking module 204 illustrated in FIG. 2 in conjunction with other software modules and data illustrated in FIGS. 2 and 3.

Figure 5:
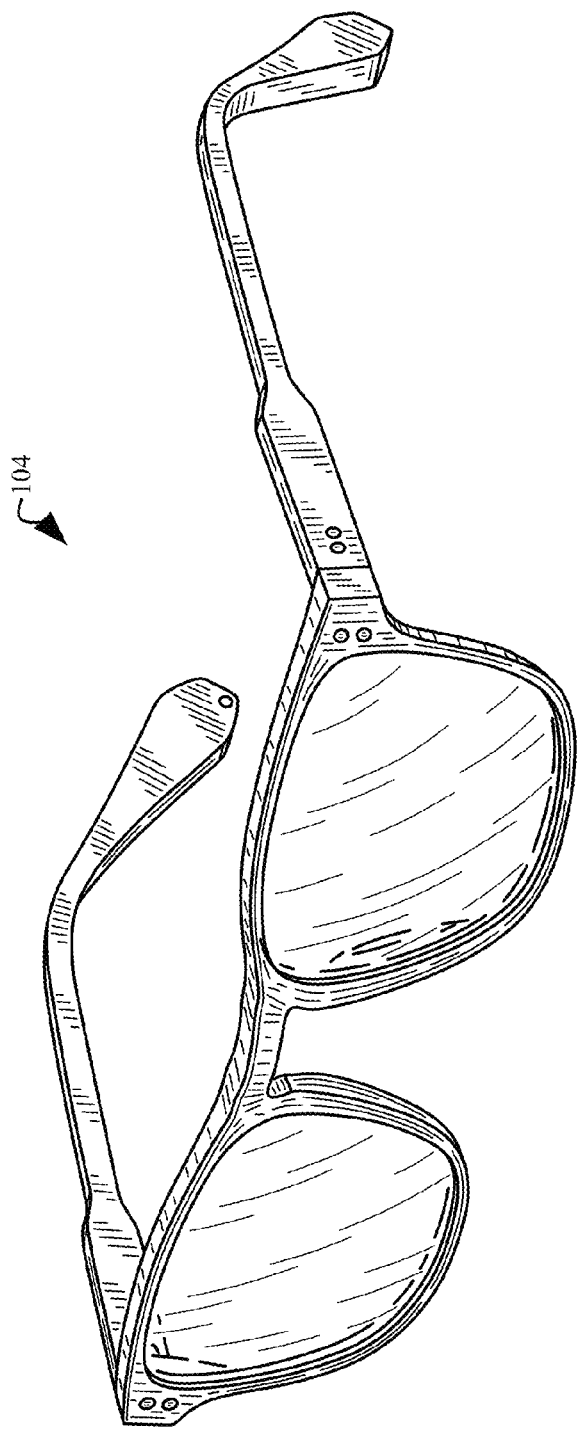
FIG. 5 illustrates a view of an object that is tracked by a portable computer system in accordance with an embodiment of the present disclosure.
Figure 6:
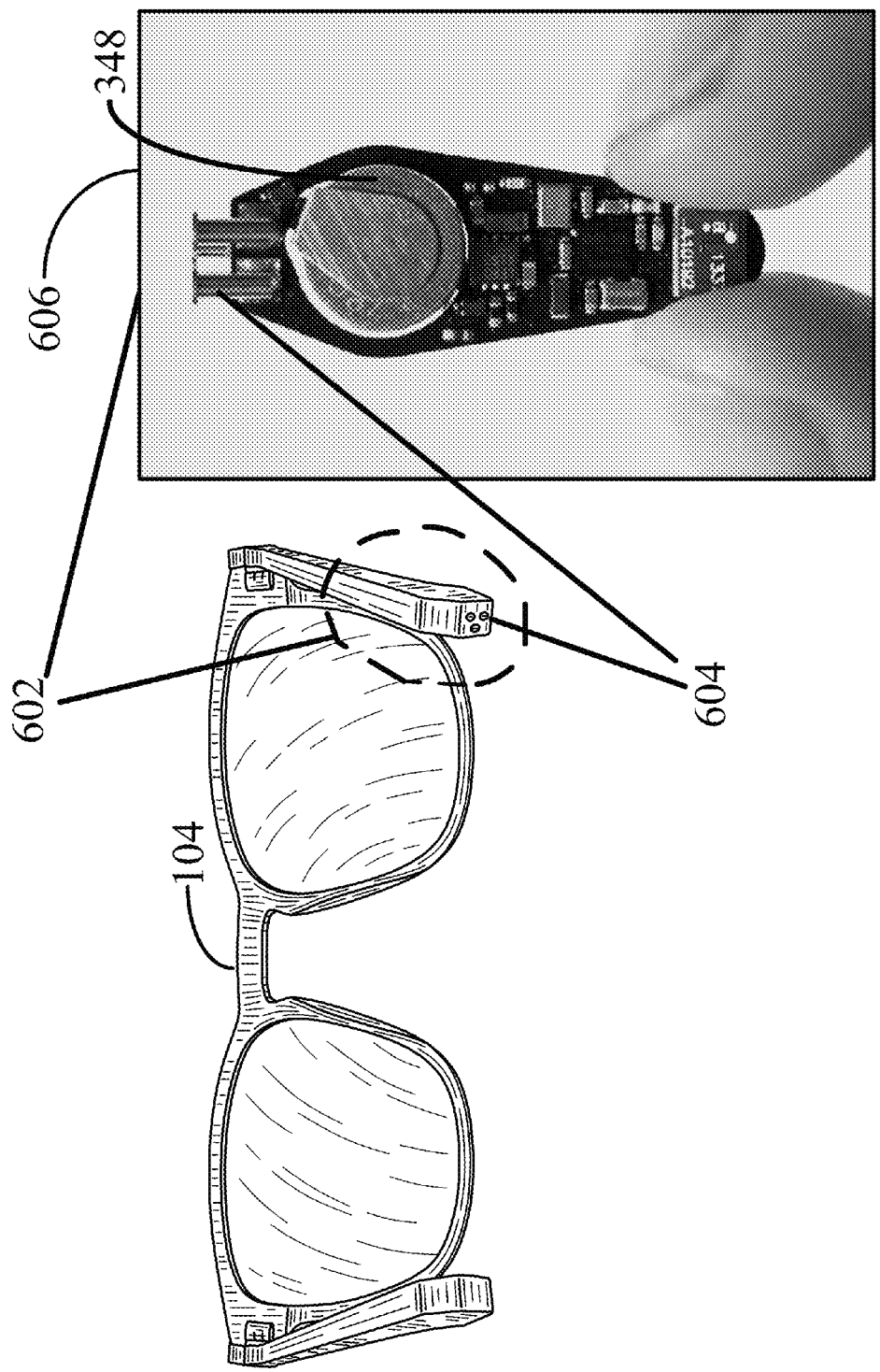
FIG. 6 illustrates another view of an object that is tracked by a portable computer system, in which electrodes of the object are in view, in accordance with an embodiment of the present disclosure.
Figure 7:
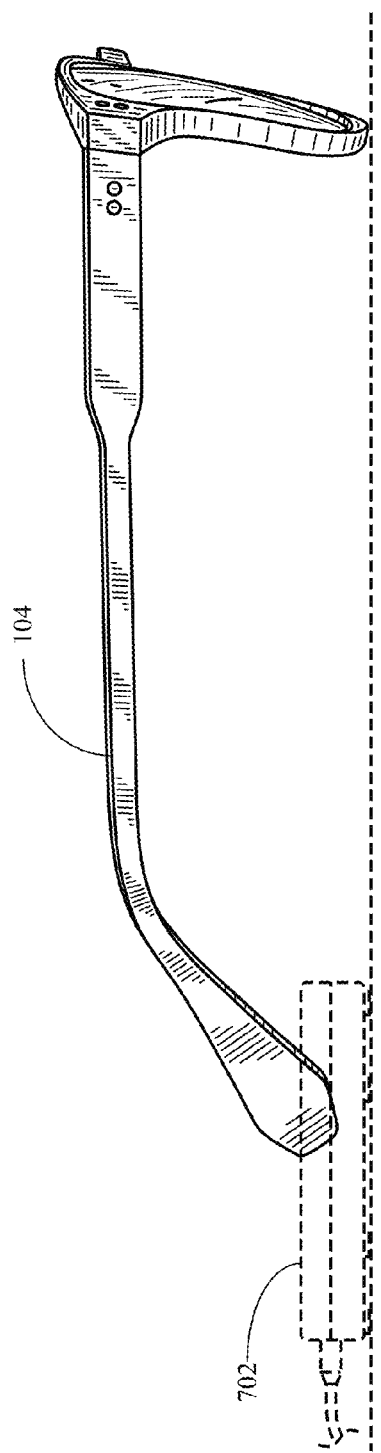
FIG. 7 illustrates another view of an object that is tracked by a portable computer system, where the object is being recharged through the electrodes illustrated in FIG. 6, in accordance with an embodiment of the present disclosure.

Block 402. Referring to block 402 of FIG. 4A, a method for tracking an object 104 (e.g., a pair of glasses) is performed at a portable computer system 102 comprising one or more processors 348, a memory 340/342, a display 352, and a receiver 358. FIG. 2 illustrates an example portable computer system 102. FIGS. 5-7 illustrate an exemplary object 104 in the form of rechargeable Bluetooth enabled eyeglasses. FIG. 5 illustrates a perspective view of the exemplary object 104. FIG. 6 illustrates a rear view of the exemplary object 104. As illustrated in FIG. 6, the right-hand temple tip 602 of the frame of the eyeglass includes the circuitry illustrated in cutout 606. This circuitry includes electrodes 604 that are designed to recharge the power supply 348 of the object 104 housed in the right-hand temple tip. For instance, the power supply 348 can be recharged through the electrodes 604 using the charging stand 702 illustrated in FIG. 7. In FIG. 7, the recharging stand is illustrated with dashed lines so that it can be seen how the electrodes 604 of the object 104 fit into the charging stand 702 to charge the power supply 348. Although the circuitry of cutout 606, including the electrodes 604 is illustrated in FIG. 6 as being housed in the right-hand temple tip, in some embodiments this circuitry is housed in the left-hand temple tip. In some embodiments some of the circuitry is housed in the left-hand temple tip and some of the circuitry is housed in the right-hand temple tip. In some embodiments, the exposed electrodes 604 are on the right-hand temple tip as illustrated in FIG. 6. In some embodiments, the exposed electrodes 604 are on the left-hand temple tip of the eyeglasses (not shown). In some embodiments, one or more exposed electrodes 604 are on the left-hand temple tip of the eyeglasses and one or more exposed electrodes 604 are on the right-hand temple tip of the eyeglasses. In some embodiments, there are two or more electrodes 604. In some embodiments, there are three or more electrodes 604. In some embodiments, there are four or more electrodes 604.

Blocks 404-405.

Figure 4A:
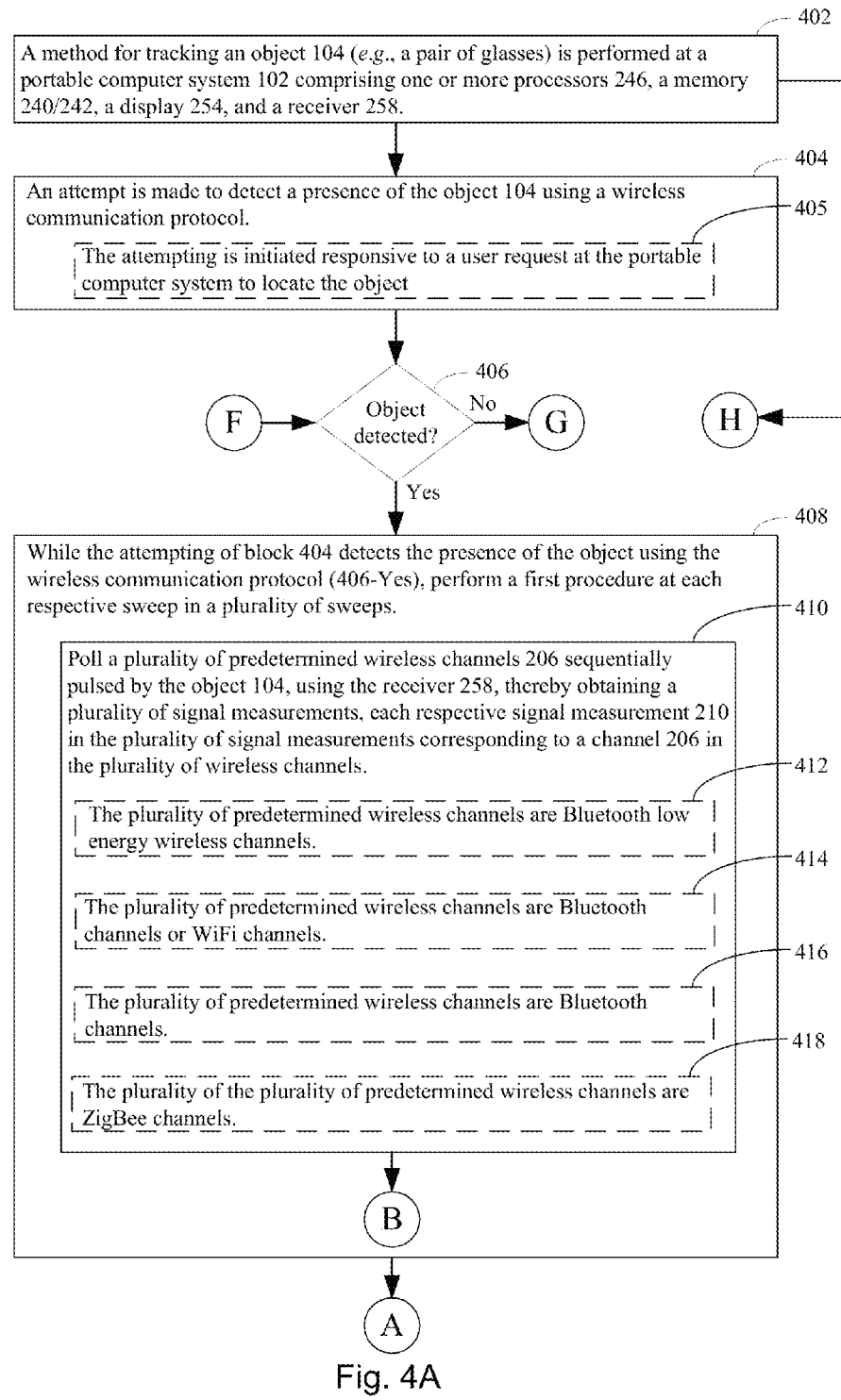
Figure 8:
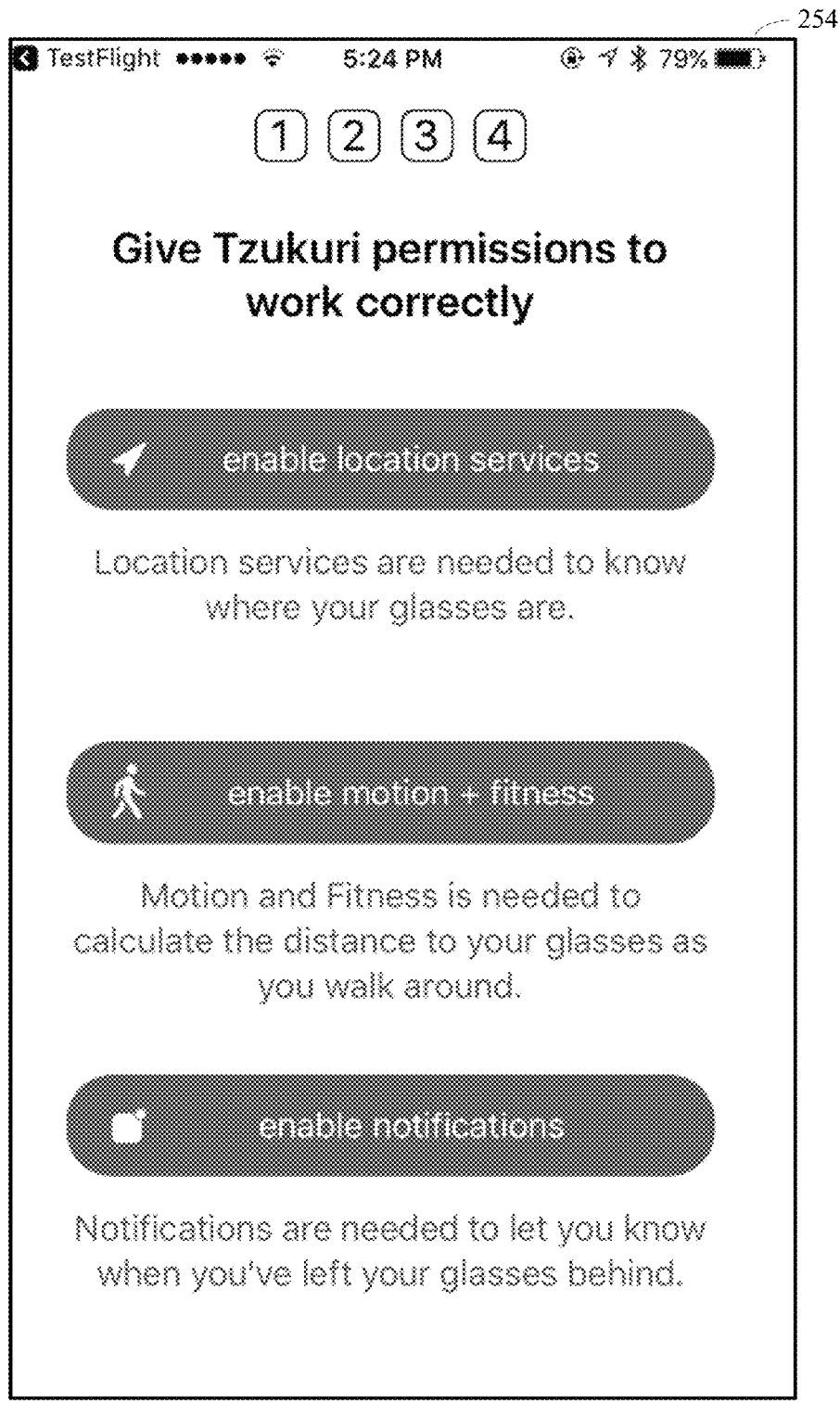
FIG. 8 illustrates a screenshot associated with an object tracking module operating on a portable computer system in which a user is advised on permissions needed to operate the object tracking module in accordance with an embodiment of the present disclosure.
Figure 9:
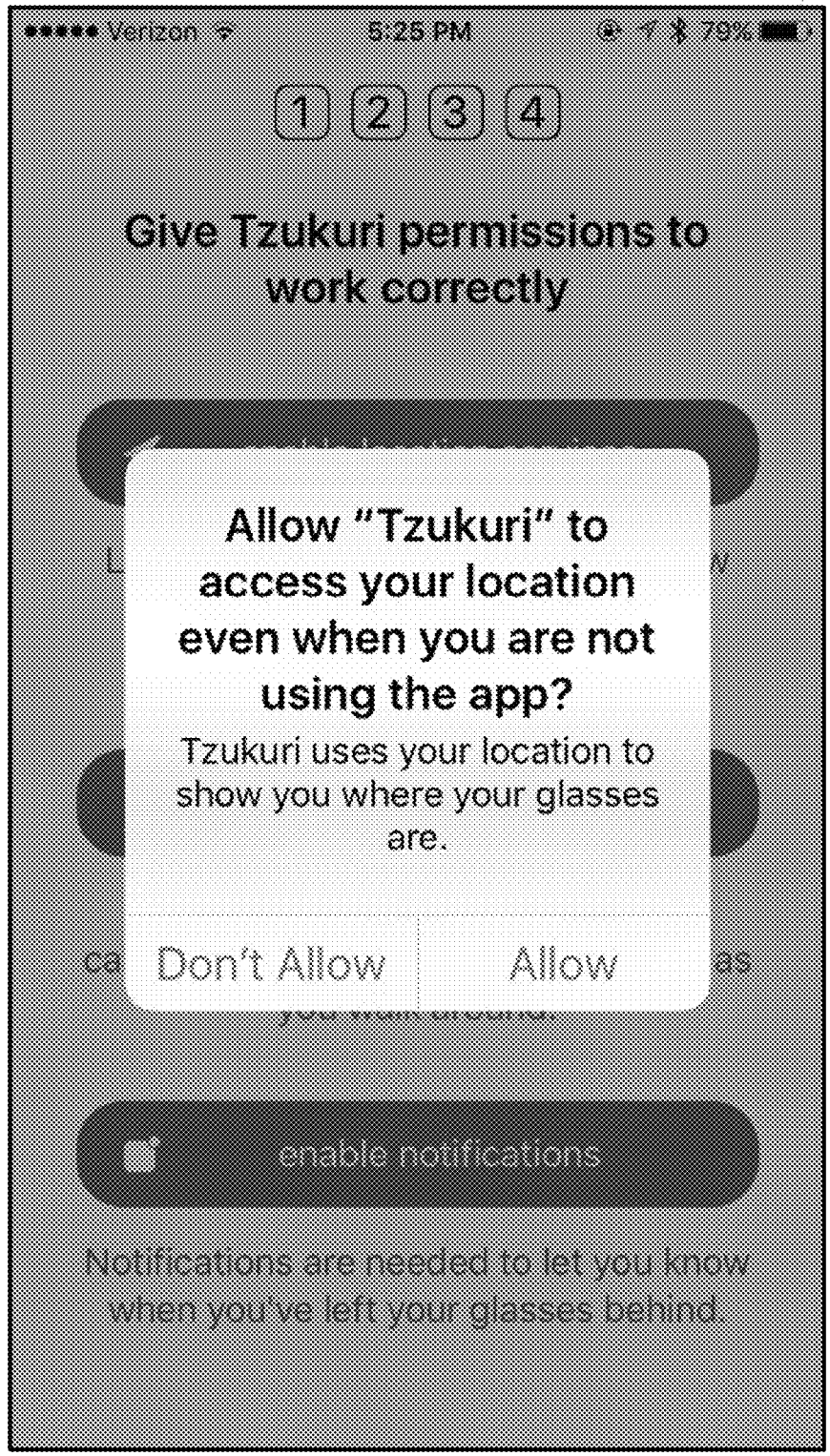
FIG. 9 illustrates a screenshot associated with an object tracking module operating on a portable computer system in which a user is advised that the object tracking module needs permission to access the location of the user even when the object tracking module is not in used in accordance with an embodiment of the present disclosure.
Figure 10:
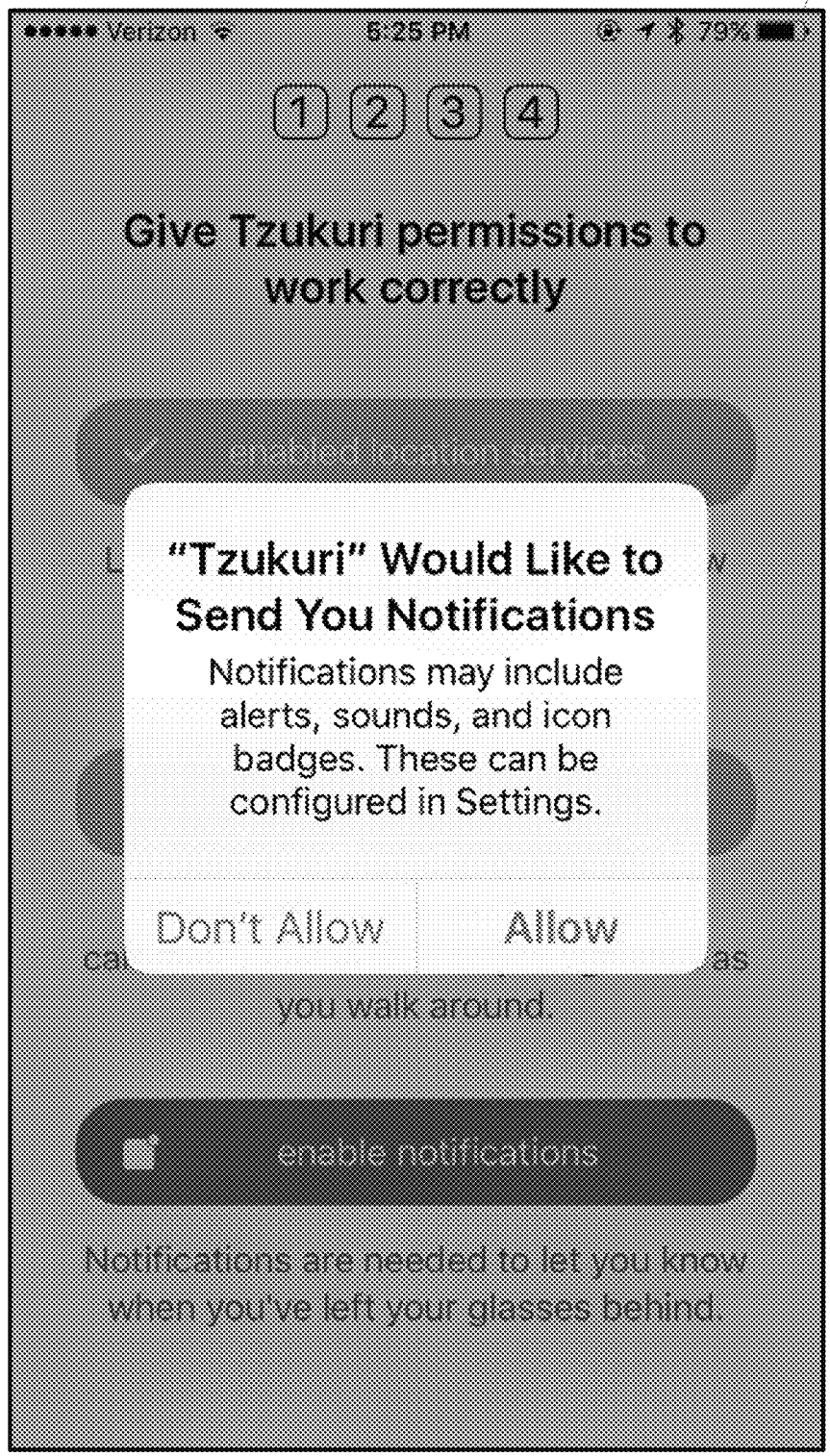
FIG. 10 illustrates a screenshot associated with an object tracking module operating on a portable computer system in which a user is advised that the object tracking module needs permission to send the user notifications in accordance with an embodiment of the present disclosure.

Referring to block 404 of FIG. 4A, an attempt is made to detect a presence of the object 104 using a wireless communication protocol. In some embodiments, the wireless communication protocol is executed by the object tracking module 204. In some embodiments, as part of the installation of the exemplary object tracking module 204, and as set forth in FIG. 8, the user is notified that the object tracking module 204 requires enablement of location services provided by the portable computer system 102. An example of such a service is the GPS 260 services of the portable computer system 102. In some embodiments, as part of the installation of the exemplary object tracking module 204, and as set forth in FIG. 8, the user is notified that the object tracking module 204 requires enablement of motion and fitness services provided by the portable computer system 102. An example of such a service is the accelerometer/ magnetometer 250 services of the portable computer system 102. In some embodiments, as part of the installation of the exemplary object tracking module 204, and as set forth in FIG. 9, the user is notified that the object tracking module 204 requires the ability to access the user's location (e.g., using the GPS 260 of the mobile computing device 102 illustrated in FIG. 2) even when the user is not using the object tracking module 204. In some embodiments, as part of the installation of the exemplary object tracking module 204, and as set forth in FIGS. 8 and 10, the user is notified that the object tracking module 204 requires notification services provided by the portable computer system 102 which typically are included in the operating system 202 installed in the portable computer system 102.

Figure 11:
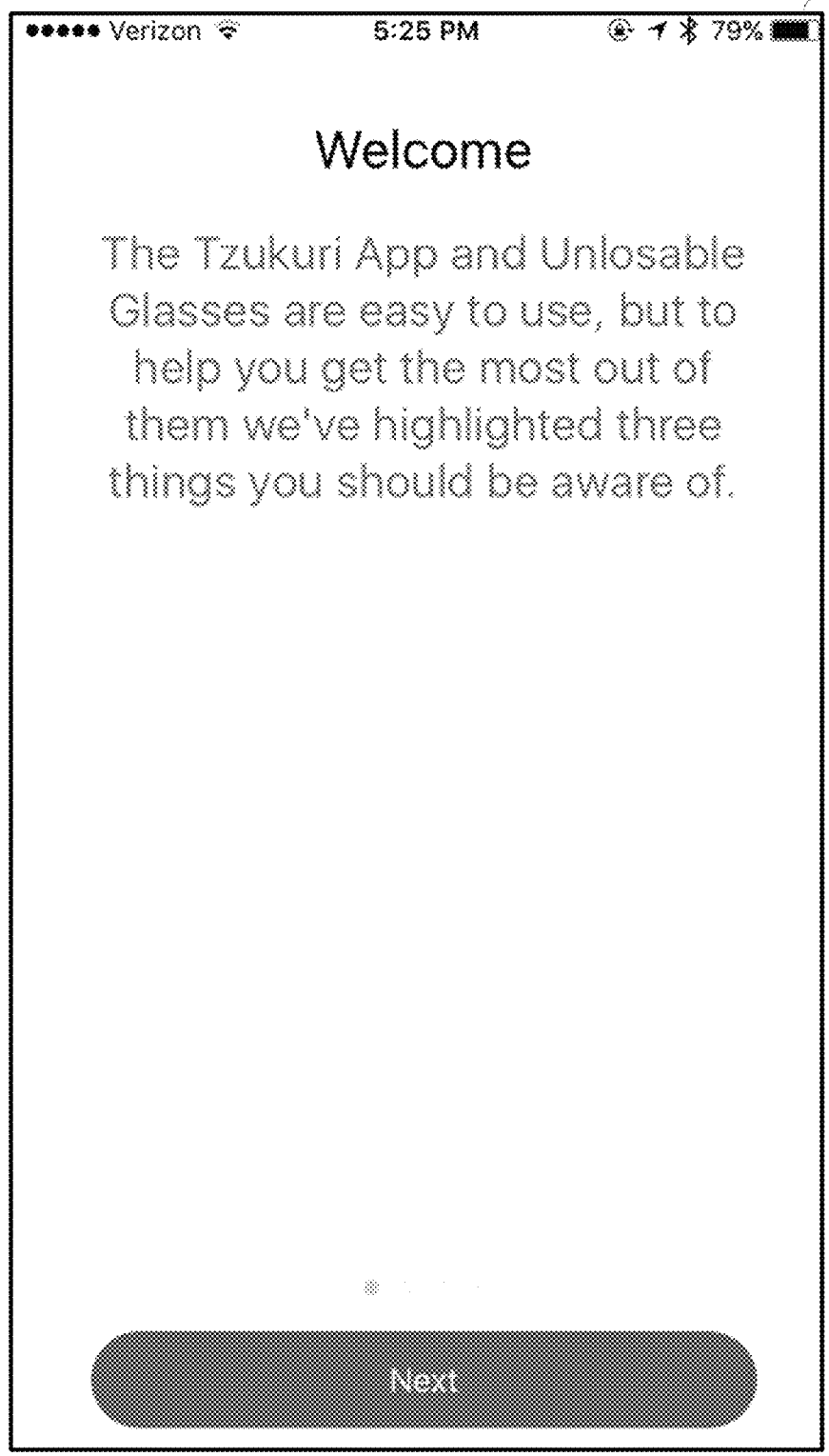
FIG. 11 illustrates a screenshot from an object tracking module operating on a portable computer system advising on object location features in accordance with an embodiment of the present disclosure.
Figure 12:
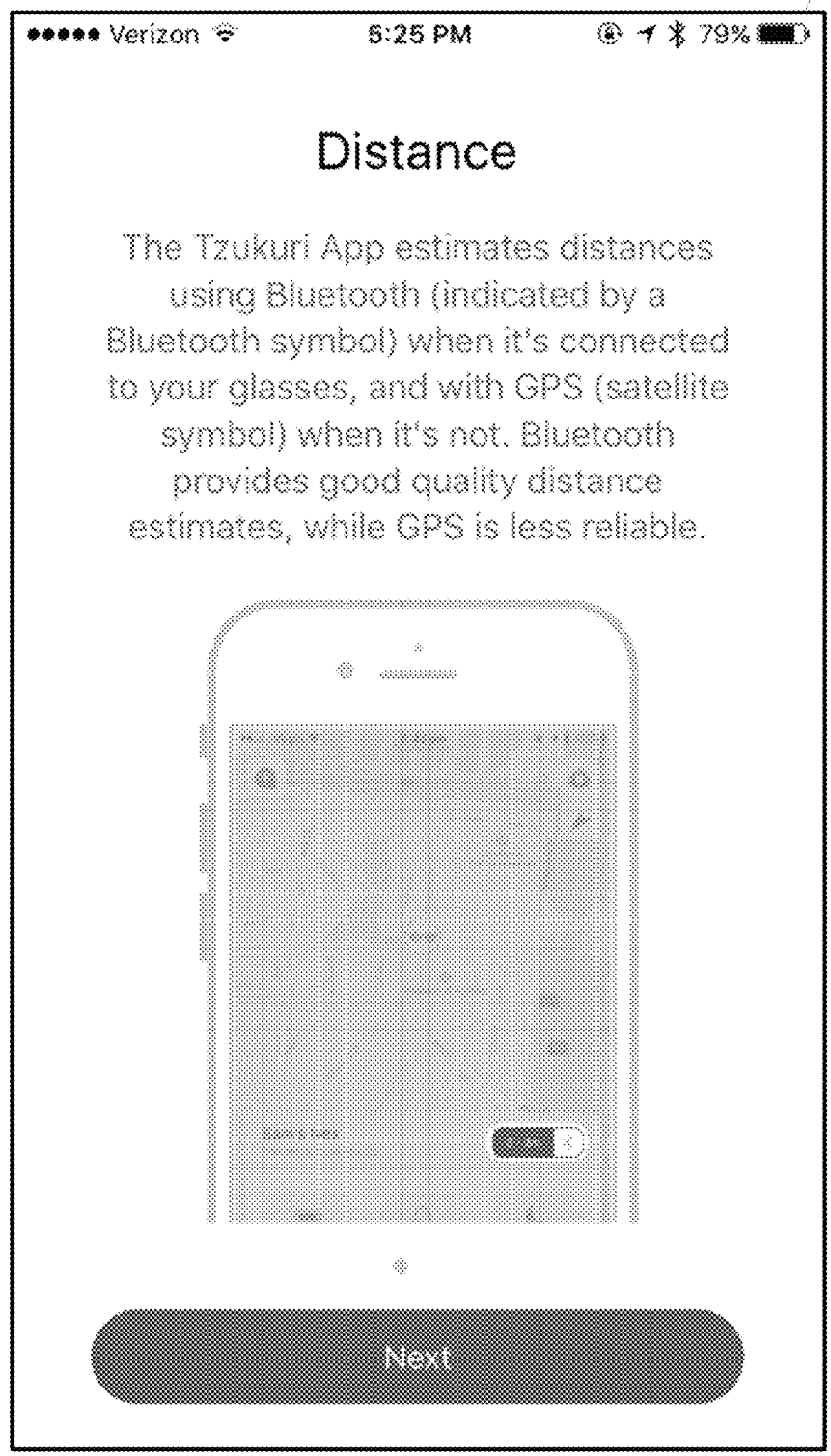
FIG. 12 illustrates a screenshot from an object tracking module operating on a portable computer system detailing how distance between the portable computer system and the target object is determined in accordance with an embodiment of the present disclosure.

In some embodiments, once the object tracking module 204 has been installed on the portable computer system 102 the user is notified of features of the object tracking module 204 as illustrated in FIGS. 11 and 12, wherein the object tracking module 204 is called the "Tzukuri App" and the object 104 is called "Unlosable Glasses." As noted in FIG. 12, in some embodiments the object tracking module estimates distances (between the portable computer system 102 on which the object tracking module 204 is installed and the object 104) using Bluetooth when the object 104 and the portable computer system 102 are paired to each other and proximate enough to each other that the portable computer system 102 can detect a Bluetooth signal from the object 104. When this is not the case, the portable computer system 102 uses a GPS signal of the portable computer system 102 to track the portable computer system 102 against the last known location of the glasses in order estimate the distance between the portable computer system 102 and the object 104 as discussed in further detail below.

Figure 13:
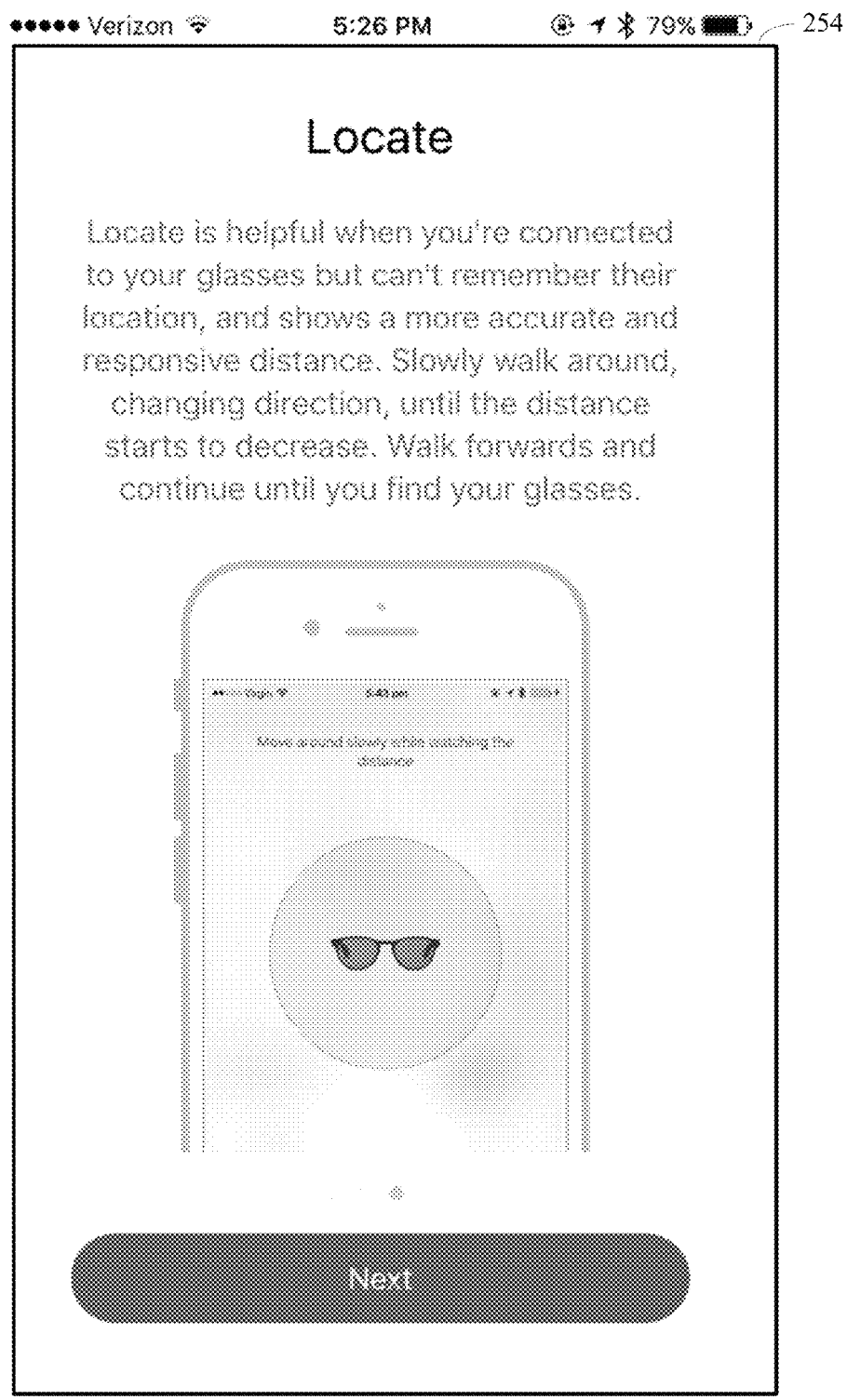
FIG. 13 explains a locate feature provided by an object tracking module operating on a portable computer system in accordance with an embodiment of the present disclosure.

In some embodiments, the attempting is initiated responsive to a user request at the portable computer system 102 to locate the object (block 405). As explained by the example object tracking module in the panel illustrated in FIG. 13, this locate feature is helpful when the object tracking module 204 and the object 104 are wirelessly connected but the user cannot remember the location of the object.

Block 406. At block 406 of FIG. 4A, a determination is made as to whether the portable computer system 102 is able to detect a paired object 104. If a determination is made that the portable computer system 102 is able to wirelessly detect the object 104 (406—Yes), process control passes on to block 408. If a determination is made that the portable computer system 102 is not able to wireless detect the object 104 (406—No), process control passes on to block 442 of FIG. 4D. In some embodiments, this wireless detecting attempted at block 406 is done using Bluetooth. In some embodiments, this wireless detecting attempted at block 406 is done using Bluetooth. in which the portable computer system 102 acts as the master and the object 104 acts as the slave.

Block 408-422. Referring to block 408 of FIG. 4A, while the attempting of block 404 detects the presence of the object using the wireless communication protocol (406— Yes), a first procedure is performed at each respective sweep 208 in a plurality of sweeps as detailed in blocks 410-422 of FIGS. 4A through 4C. This first procedure necessarily requires wireless communication between the portable computer system 102 and the object 104 and therefore, at any time if the wireless signal between the system 102 and the object is lost, the condition 406-No is triggered and process control passes to block 442 of FIG. 4D.

Referring to block 410 of FIG. 4A, the first procedure polls a plurality of predetermined wireless channels 206, sequentially pulsed by the object 104, using the receiver 258 of the portable computer system 102, thereby obtaining a plurality of signal measurements, each respective signal measurement 210 in the plurality of signal measurements corresponding to a channel 206 in the plurality of wireless channels.

Advantageously, this polling is done as quickly as possible. For instance, in some embodiments where Bluetooth Low Energy is used for this wireless communication, to speed up the connection, the slave device (the object 104) requests a faster connection from the master device (the portable computer system 102) using the Bluetooth Low Energy connection parameter settings. That is, using the Bluetooth Low Energy 'connection parameters', a slave device (the object 104) can request the master device (the portable computer system 102) to use new parameters and thus increase the speed at which channels are sampled. It is up to the master device (portable computer device 102) to decide what the eventual parameters will be for the Bluetooth Low Energy but generally the object 104 gets a speed close to what is requested. When the requested speed is not granted, it is generally because the portable computer system 102 is connected to another Bluetooth device or has decided to throttle the connection to the object 104 to save power.

As described, the first procedure polls the plurality of predetermined wireless channels 206, sequentially pulsed by the object 104, using the receiver 258 of the portable computer system 102, thereby obtaining a plurality of signal measurements, each respective signal measurement 210 in the plurality of signal measurements corresponding to a channel 206 in the plurality of wireless channels. However, in alternative embodiments, the plurality of predetermined wireless channels 206 are sequentially pulsed by the portable computer device 102 and a receiver of the object is used to obtain the plurality of signal measurements, each respective signal measurement 210 in the plurality of signal measurements corresponding to a channel 206 in the plurality of wireless channels.

Figure 25:
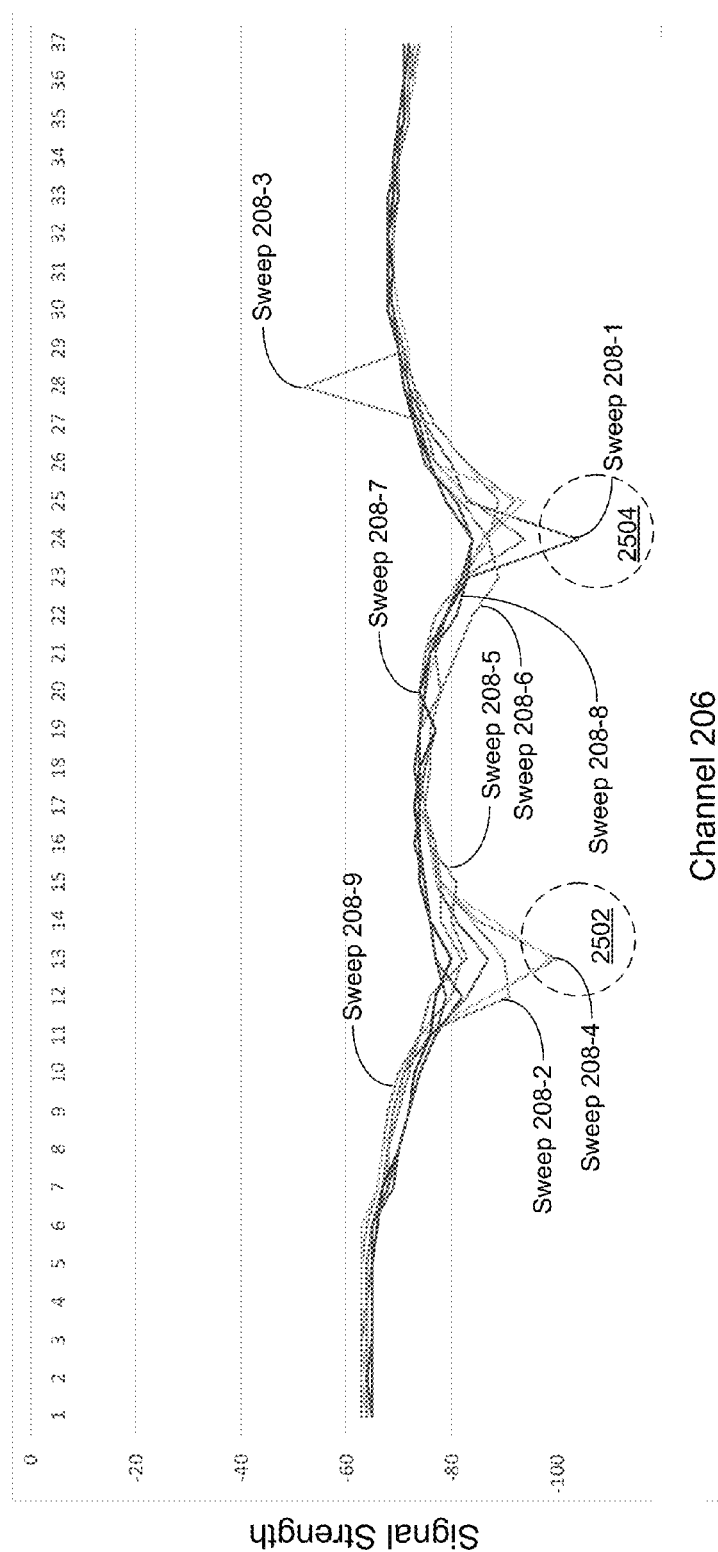
FIG. 25 illustrates measured signal strength for each wireless channel in a plurality of wireless channels across a plurality sweeps in accordance with an embodiment of the present disclosure.

Regardless of which device (the portable computer system 102 or the object 104) takes the measurements, the polling in the first procedure takes measurements from the plurality of wireless channels 206, sequentially pulsed, thereby obtaining a plurality of signal measurements, each respective signal measurement 210 in the plurality of signal measurements corresponding to a channel 206 in the plurality of wireless channels. FIG. 25 illustrates the measurement that is obtained for each channel in a plurality of channels over a plurality of sweeps. FIG. 26 tabulates these same received signal strength indicator (RSSI) measurements in units of dBm. Despite the fact that the object 104 and the portable computing device 102 are the same distance apart in any given sweep 208, the signal strength of each channel varies even within the same sweep. This deficiency is handled in the first procedure as described in further detail below.

In some embodiments, the plurality of predetermined wireless channels are Bluetooth low energy wireless channels (block 412). In some embodiments, the plurality of predetermined wireless channels are Bluetooth channels or WiFi channels (block 414). In some embodiments, the plurality of predetermined wireless channels are Bluetooth channels (block 416). In some embodiments, the plurality of predetermined wireless channels are ZigBee channels (block 418).

Figure 4B:
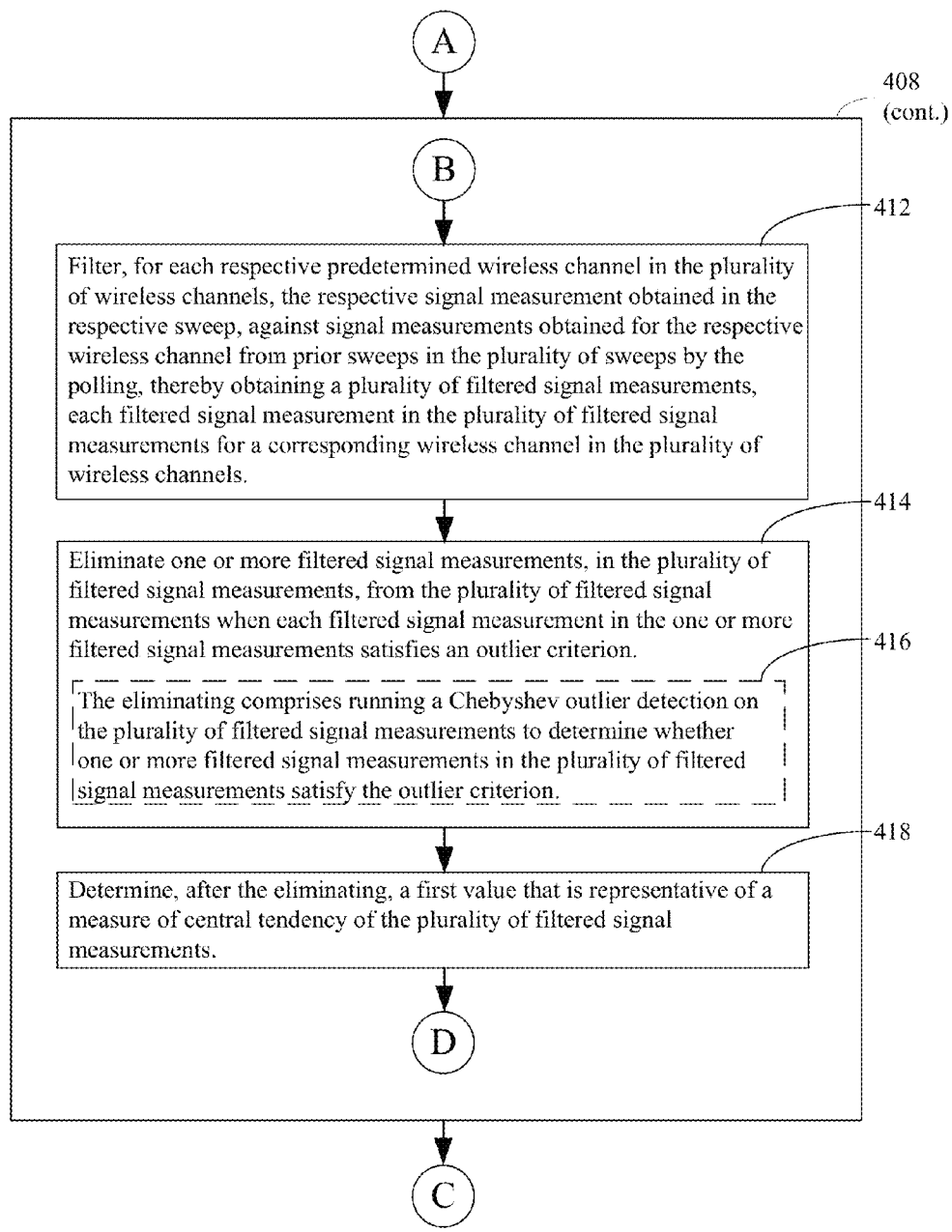

Referring to block 412 of FIG. 4B, the first procedure continues by filtering, for each respective predetermined wireless channel 206 in the plurality of wireless channels, the respective signal measurement 210 obtained in the respective sweep 208, against signal measurements obtained for the respective wireless channel from prior sweeps in the plurality of sweeps by the polling of block 410, thereby obtaining a plurality of filtered signal measurements, each filtered signal measurement 212 in the plurality of filtered signal measurements for a corresponding wireless channel 206 in the plurality of wireless channels. Thus, referring to FIG. 2, consider wireless channel 206-1 to illustrates. At each sweep 208, a signal measurement 210 of the wireless channel 206-1 is made (e.g., a received signal strength indicator (RSSI) measurements in units of dBm). As FIGS. 25 and 26 indicate, this measurement is noisy. As such, the signal measurement 210 at a current sweep 208 is filtered against prior measurements on the channel 210-1 from prior sweeps. In some such embodiments, these prior measurements on the channel 210-1 from prior sweeps are in the form of a filter value 214. Thus, in such embodiments, the filtered signal measurement 212 of wireless channel 206-1 is at sweep 208-N is filtered against the wireless channel filter value 214-1 to form a filtered signal measurement 212-1. In some such embodiments, the filtering that is applied is a standard 1D Kalman filter in which each channel is initialized (at the first sweep) with the same values. See Zarchan and Musoff, 2000, Fundamentals of Kalman Filtering: A Practical Approach, American Institute of Aeronautics and Astronautics, Incorporated. ISBN 978-1-56347-455-2, and Kalman, 1960. "A New Approach to Linear Filtering and Prediction Problems," Journal of Basic Engineering 82, pp. 35 for exemplary disclosure on Kalman filtering. Thus, the wireless channel filter value 214 is initialized to the same value. Then, the wireless channel filter value 214 for each channel independently changes as the filter value is updated for each respective channel based upon the signal measurements 210 made for the respective channel 206.

In some embodiments, the past signal measurements 210 of all the channels are used to form the wireless channel filter value 214. Thus, in such embodiments there is just a single wireless channel filter value 214 that is common to all the wireless channels.

In some embodiments, only those past signal measurements 210 that have been acquired within a threshold period of time contribute to a wireless channel filter value (e.g., those measurements that have been taken in the past 10 seconds, the past minute, the past five minutes).

Once a filtered signal measurement 212 for a channel 206 has been calculated for a current sweep 208, it is stored as the wireless channel filter signal measurement 216 for the wireless channel 206. In other words, for ease of reference in the discussion below, the wireless filtered signal measurement 216 of a particular wireless channel 206 in the current sweep 208 is the filtered signal measurement 212 of that sweep 208. When a new sweep is conducted, the measurement 216 is overwritten with the new measurement 212. The collection of wireless channel filter signal measurements 216 across the plurality of channels constitute a plurality of filtered signal measurements.

Referring to block 414 of FIG. 4B, the first procedure continues by eliminating one or more filtered signal measurements 216, in the plurality of filtered signal measurements, using an elimination function 218, from the plurality of filtered signal measurements when each filtered signal measurement 216 in the one or more filtered signal measurements satisfies an outlier criterion. For instance, referring to block 416, in some embodiments such elimination comprises running a Chebyshev outlier detection on the plurality of filtered signal measurements 216 of a given sweep 208 to determine whether one or more filtered signal measurements 212 in the plurality of filtered signal measurements of the sweep 208 satisfy the outlier criterion. The outlier criterion is application dependent and will vary based on wireless signal type, environment, signal strength to name a few possible parameters that affect the value of the outliner criterion. See Ferryman and Cooley, "Data outlier detection using the Chebyshev theorem," which is hereby incorporated by reference, for a discussion of Chebyshev outlier detection algorithm.

Referring to FIG. 25, it will be appreciated that the purpose of the filtering of block 412 and the elimination of block 414 is to discard or downweight signal measurements such as the one taken on channel 206-13 in sweep 208-4 (denoted by circle 2502) and the one taken on channel 208-23 in sweep 208-1 (denoted by circle 2504).

In some embodiments, a wireless channel 206 is tracked by the object tracking module using the following channel class in Swift class:

```
1 Channel {
2/// kalman filter for the current channel used to smooth
'measurement'
3/// and set the 'filtered' property
4 let filter: KalmanFilter
6/// current raw RSSI measurement
7 var measurement: Double
8
9/// current filtered RSSI measurement
var filtered: Double
11
12/// 0 based channel index (0-36)
13 let index: Int
14
/// true when the channel is valid in the current channel map
16/// (the master device can turn channels on/off during a conn.
17/// this tracks whether a channel is currently on)
18 var active=false
19}
```

In this construct, line 4 stores the wireless channel filter value 214. Line 7 stores the signal measurement 210. Line 11 stores the filter signal measurement 212. Index 13 specifies which channel 206 the construct is for. Line 18 indicates whether the master device (the portable computer system 102) has turned on the particular channel 206 during the polling (var active=true) or turned off the particular channel during the polling (var active=false). If the portable computer system 102 has turned off the particular channel 206 during the polling, it is not filtered and does not contribute to the distance calculations made by the first procedure.

Referring to block 418 of FIG. 4B, the first procedure continues by determining, after the eliminating of block 414, a first value 220 that is representative of a measure of central tendency (e.g. measure of central tendency value 220) of the plurality of filtered signal measurements. That is, after the elimination of block 414, a measure of central tendency 220 of the remaining filtered signal measurements in the plurality of filtered signal measurements is taken (e.g., an arithmetic mean, weighted mean, midrange, midhinge, trimean, Winsorized mean, median, or mode of the remaining filtered signal measurements in the plurality of filtered signal measurements). In other words, in some embodiments the first value is a measure of central tendency 220 of the remaining filtered signal measurements in the plurality of filtered signal measurements (e.g., an arithmetic mean, weighted mean, midrange, midhinge, trimean, Winsorized mean, median, or mode of the remaining filtered signal measurements in the plurality of filtered signal measurements).

Figure 4C:
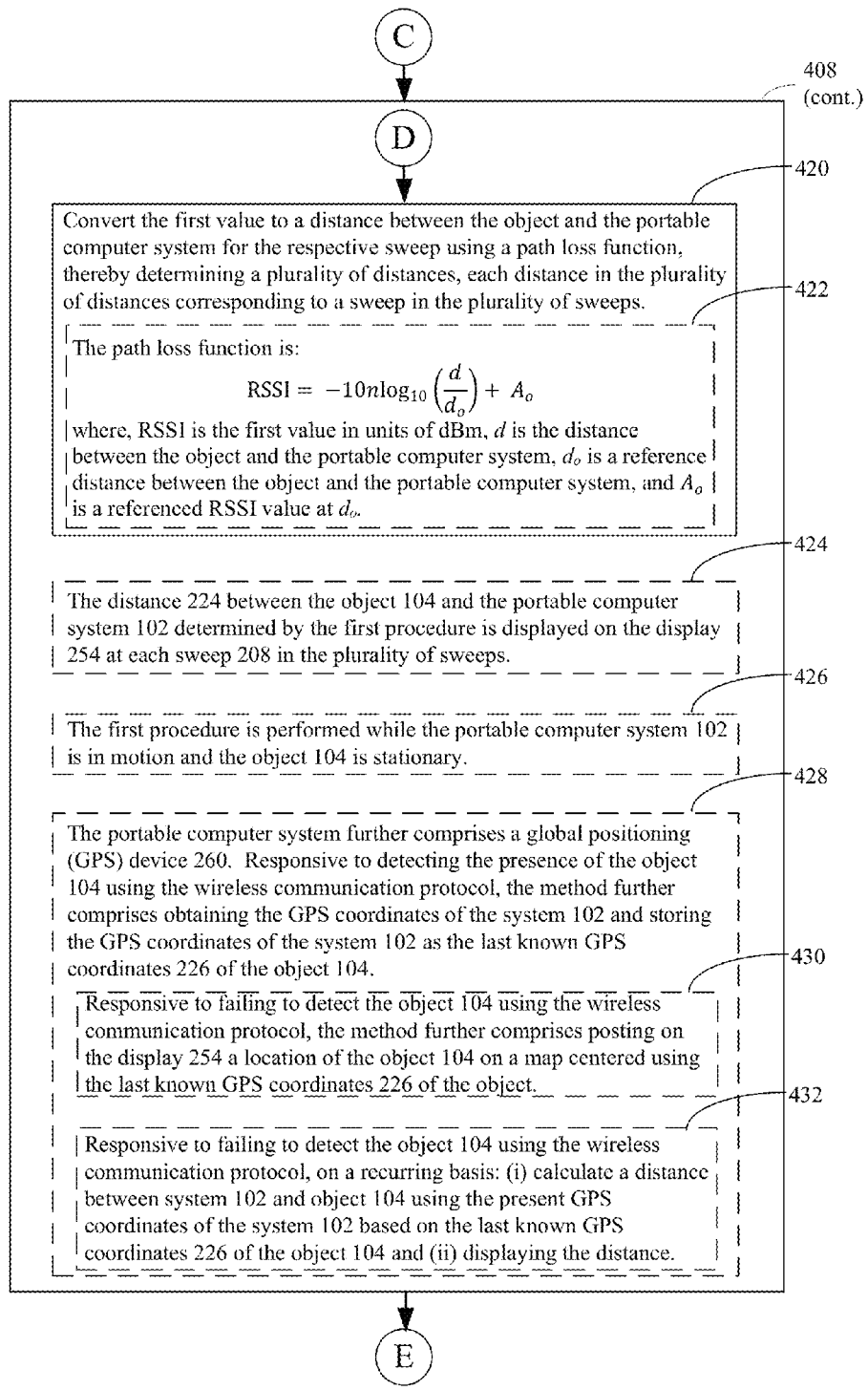

Referring to block 420 of FIG. 4C, the first procedure continues by converting the measure of central tendency 220 to a distance between the object 104 and the portable computer system 102 for the respective sweep 208 using a path loss function 222, thereby determining a plurality of distances, each distance 224 in the plurality of distances corresponding to a sweep 208 in the plurality of sweeps. Referring to block 422, in some embodiments, the path loss function is optionally calculated as $$RSSI = -10n\log_{10}\left(\frac{d}{d_o}\right) + A_o$$

where RSSI is the first value in units of dBm, d is the distance between the object 104 and the portable computer system 102, $d_o$ is a reference distance between the object and the portable computer system, $A_o$ is a referenced RSSI value at do, and n is a propagation constant or path-loss exponent (e.g., 2 for free space). See, Thapa and Case, 2003, "An Indoor Positioning Service for Bluetooth and Ad Hoc Networks," Midwest Instruction and Computing Symposium, MICS, which is hereby incorporated by reference.

Block 424.

Figure 16:
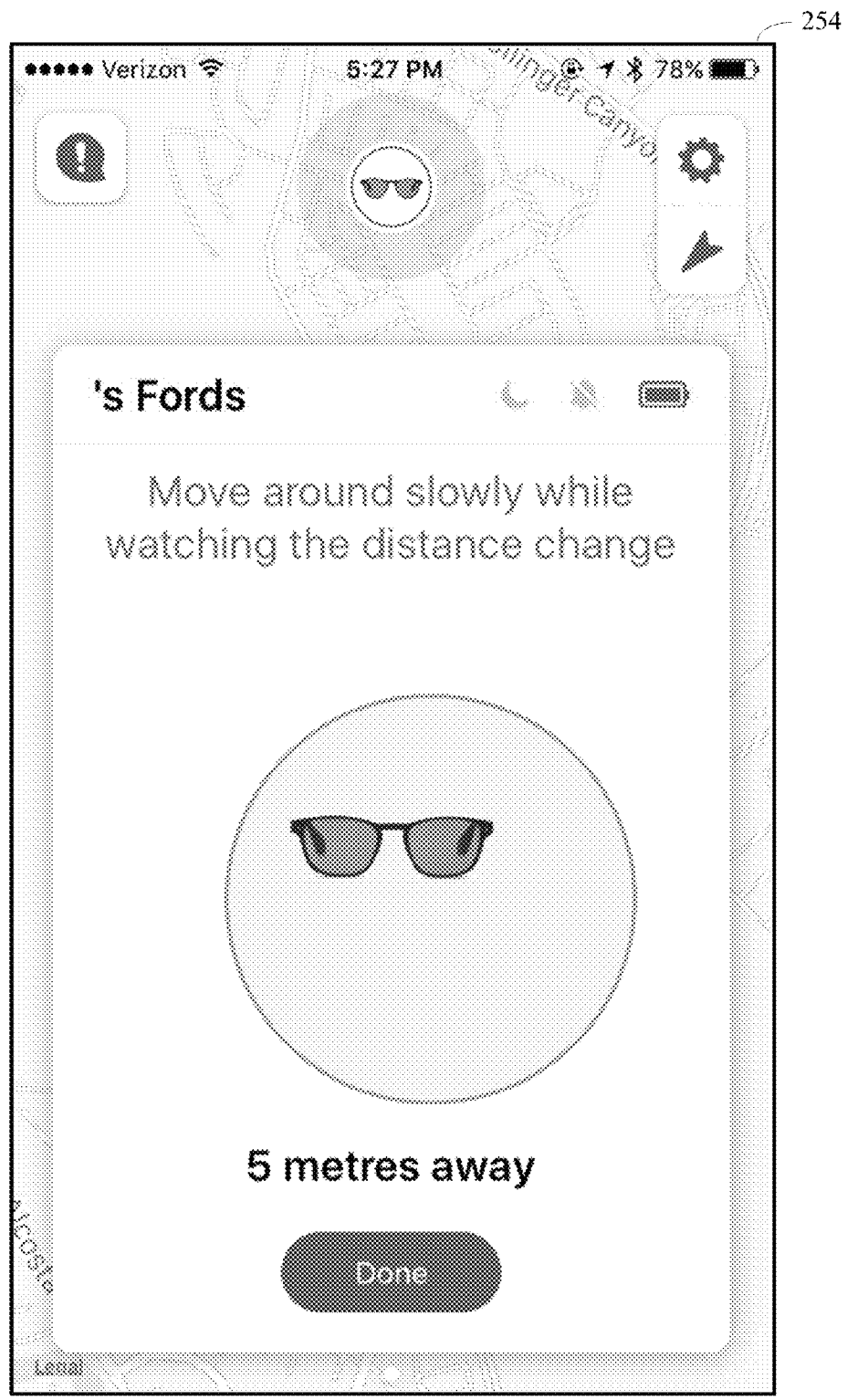
FIG. 16 illustrates how an approximate distance between a portable computer system and a target object is provided using a locate feature of an object tracking module operating on the portable computer system in accordance with an embodiment of the present disclosure.
Figure 17:
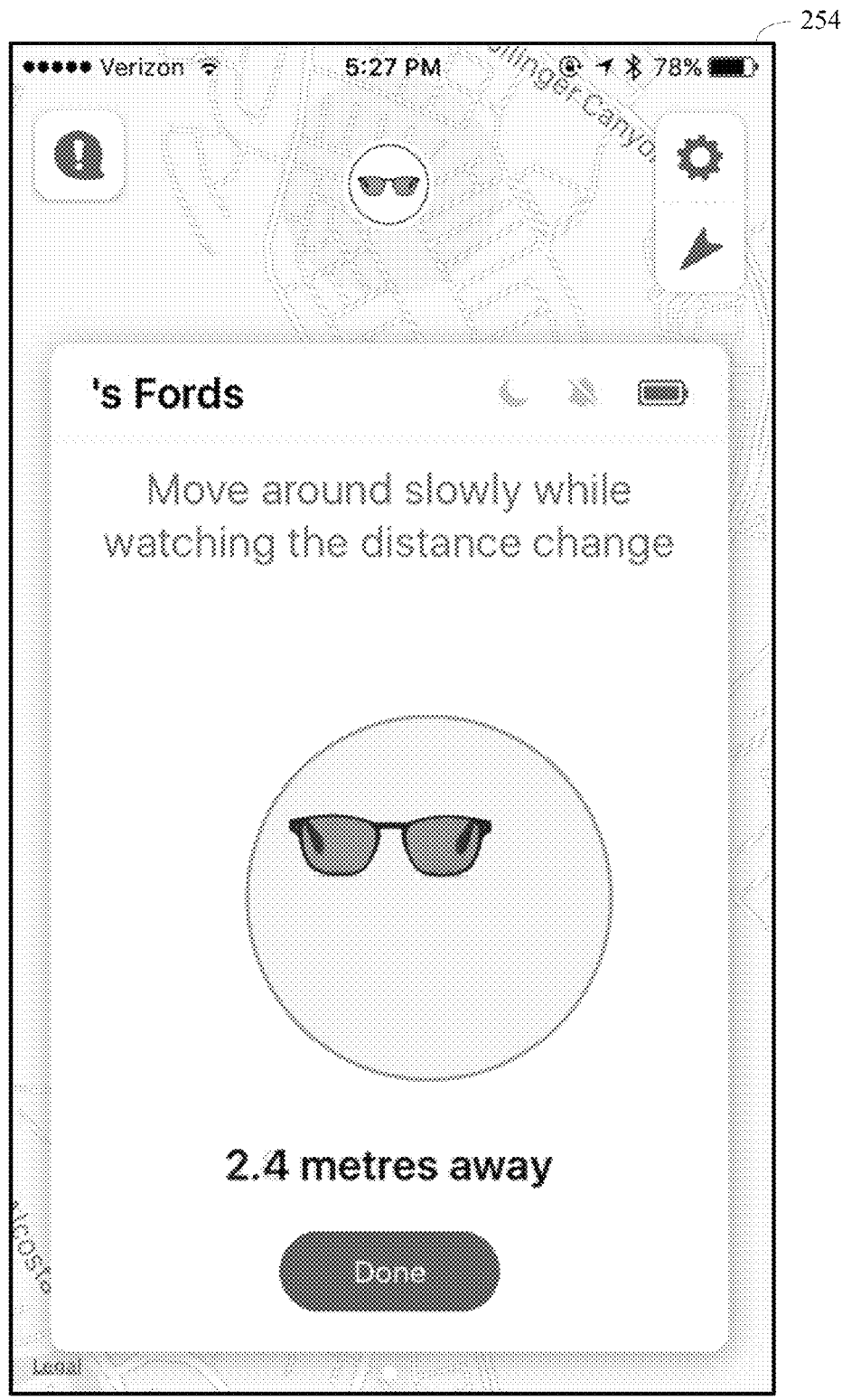
FIG. 17 illustrates how an approximate distance between a portable computer system and a target object is provided using a locate feature of an object tracking module operating on the portable computer system in accordance with an embodiment of the present disclosure, where the distance between the portable computer system and the target object is now closer than it was in FIG. 16.
Figure 18:
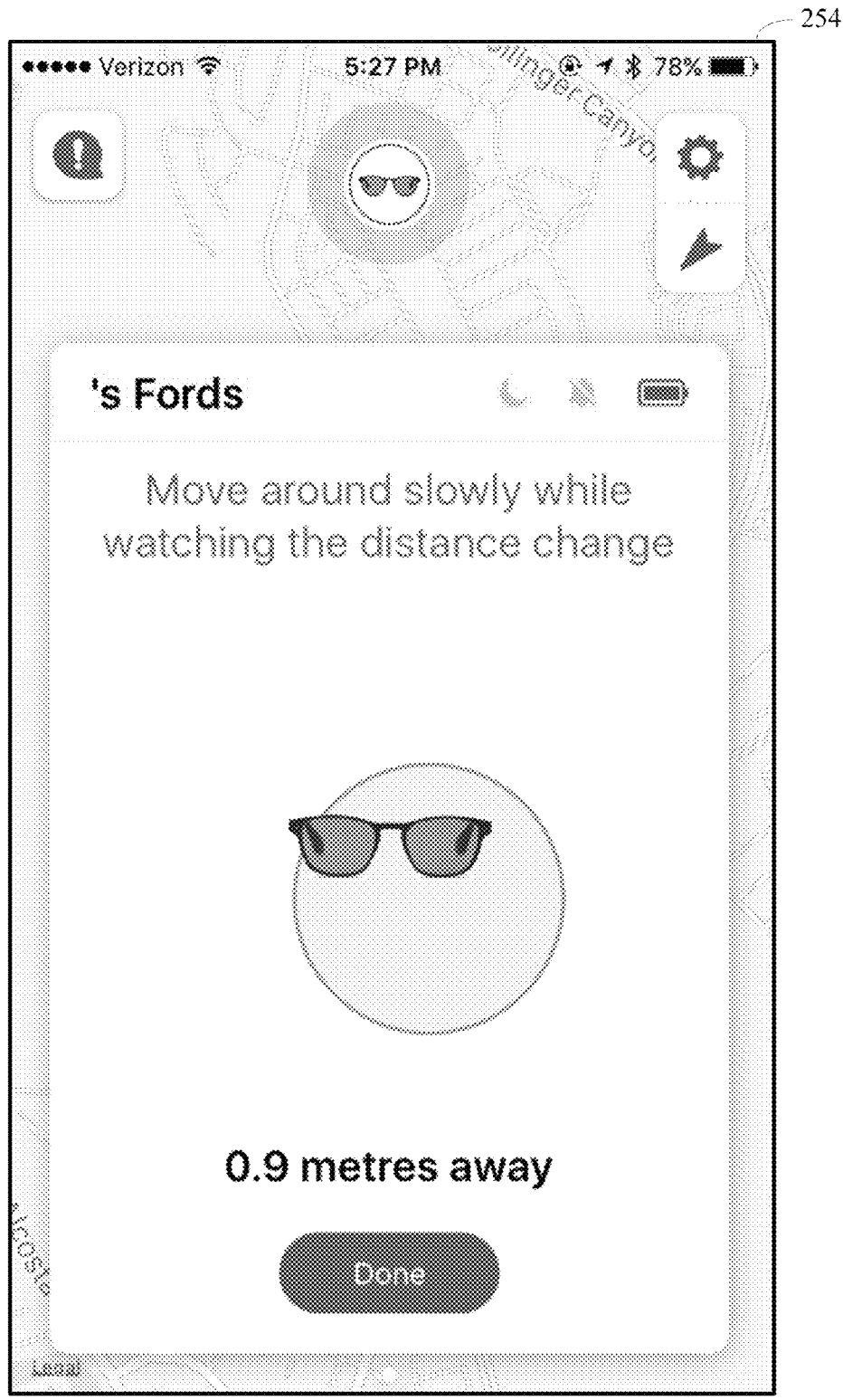
FIG. 18 illustrates how an approximate distance between a portable computer system and a target object is provided using a locate feature of an object tracking module operating on the portable computer system in accordance with an embodiment of the present disclosure, where the distance between the portable computer system and the target object is now closer than it was in FIG. 17.

Referring to block 424 of FIG. 4C, in some embodiments, the distance 224 between the object 104 and the portable computer system 102 determined by the first procedure is displayed on the display 254 at each sweep 208 in the plurality of sweeps. This is illustrated in FIGS. 16 through 18 where it is seen that between the sweep 208 illustrated in FIG. 16, the sweep illustrated in FIG. 17, and the sweep illustrated in FIG. 18, the distance 224 between the object 104 and the portable computer system 102 progressively decreased.

Block 426.

Referring to block 426 of FIG. 4C, in some embodiments, the first procedure is performed while the portable computer system 102 is in motion and the object 104 is stationary. For instance, as recommended in the panel illustrated in FIG. 13, the user holding the portable computer system 102 is to slowly walk around, changing direction, until the distance to the object 104 starts to decrease.

Blocks 428-432.

Referring to block 428 of FIG. 4C, in some embodiments the portable computer system 102 further comprises a global positioning (GPS) device 260. Responsive to detecting the presence of the object 104 using the wireless communication protocol, the method further comprises obtaining the GPS coordinates of the portable computer system 102 and storing these GPS coordinates of the system 102 as the last known GPS coordinates 226 of the object 104. The purpose for this is to continually have the best possible GPS coordinates for the object 104. In typical embodiments, the object 104 does not have GPS capability. Thus, the portable computer system 102 acts as a surrogate source for GPS coordinates based on the assumption that if condition 406—Yes holds (the portable computer system 102 and the paired object 104 are in wireless contact with each other e.g., by Bluetooth low energy protocol) then the present GPS location of the portable computer system 102 also represents the GPS location of the object 104. So, the GPS coordinates of the mobile computing device 102 at the time (or just prior to the time) when the signal to the object 104 is lost serve as the last known GPS coordinates of the object 226. These GPS coordinates arc stored by the portable computer system 102 and are used to locate the object 104 when the first procedure cannot be used in some embodiments as detailed below with reference to embodiments 430 and 432.

Figure 14:
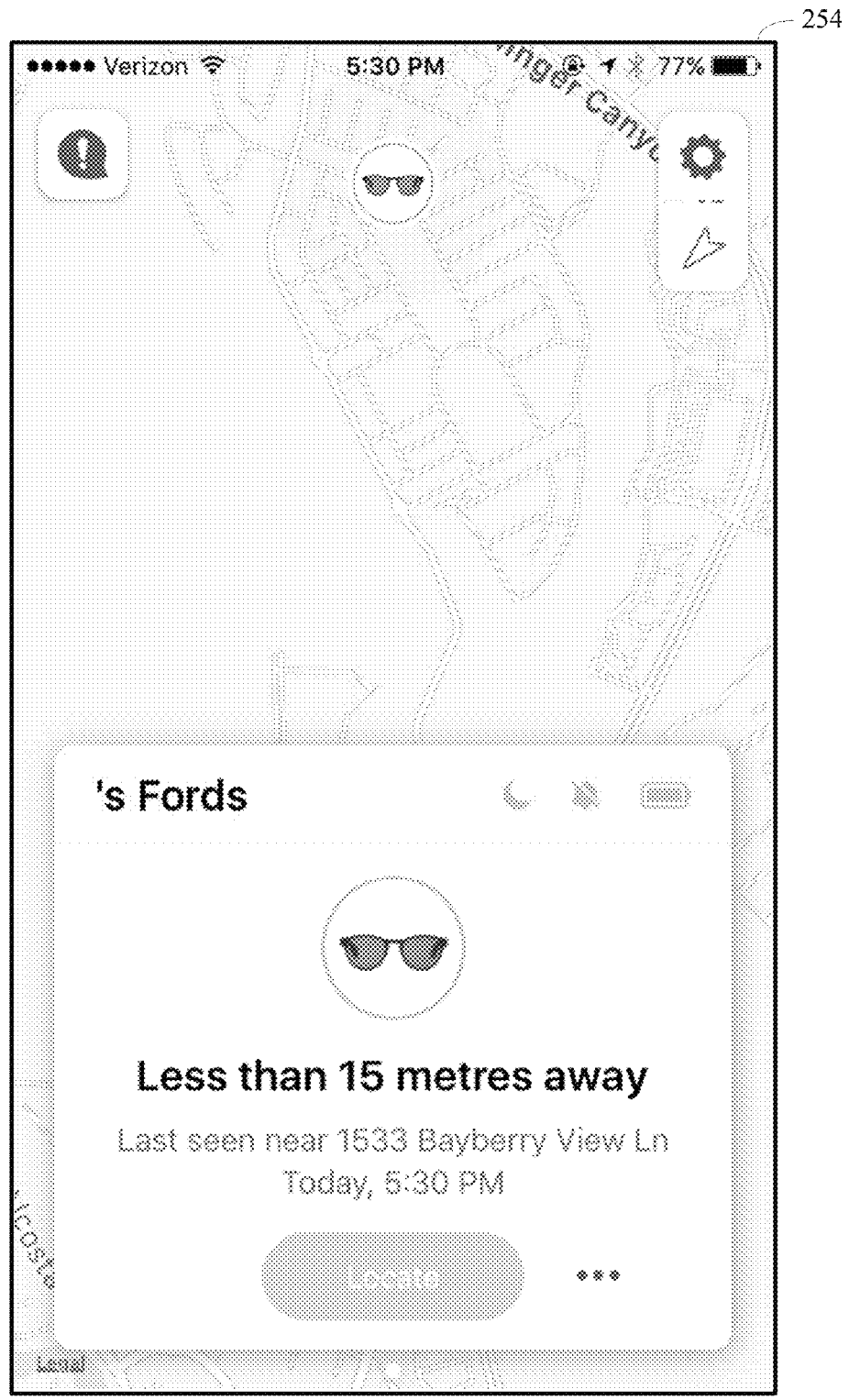
FIG. 14 illustrates how a target object is pinpointed on a map on a display of a portable computer system together with an approximate distance between the portable computer system and the target object using an object tracking module operating on the portable computer system in accordance with an embodiment of the present disclosure.
Figure 15:
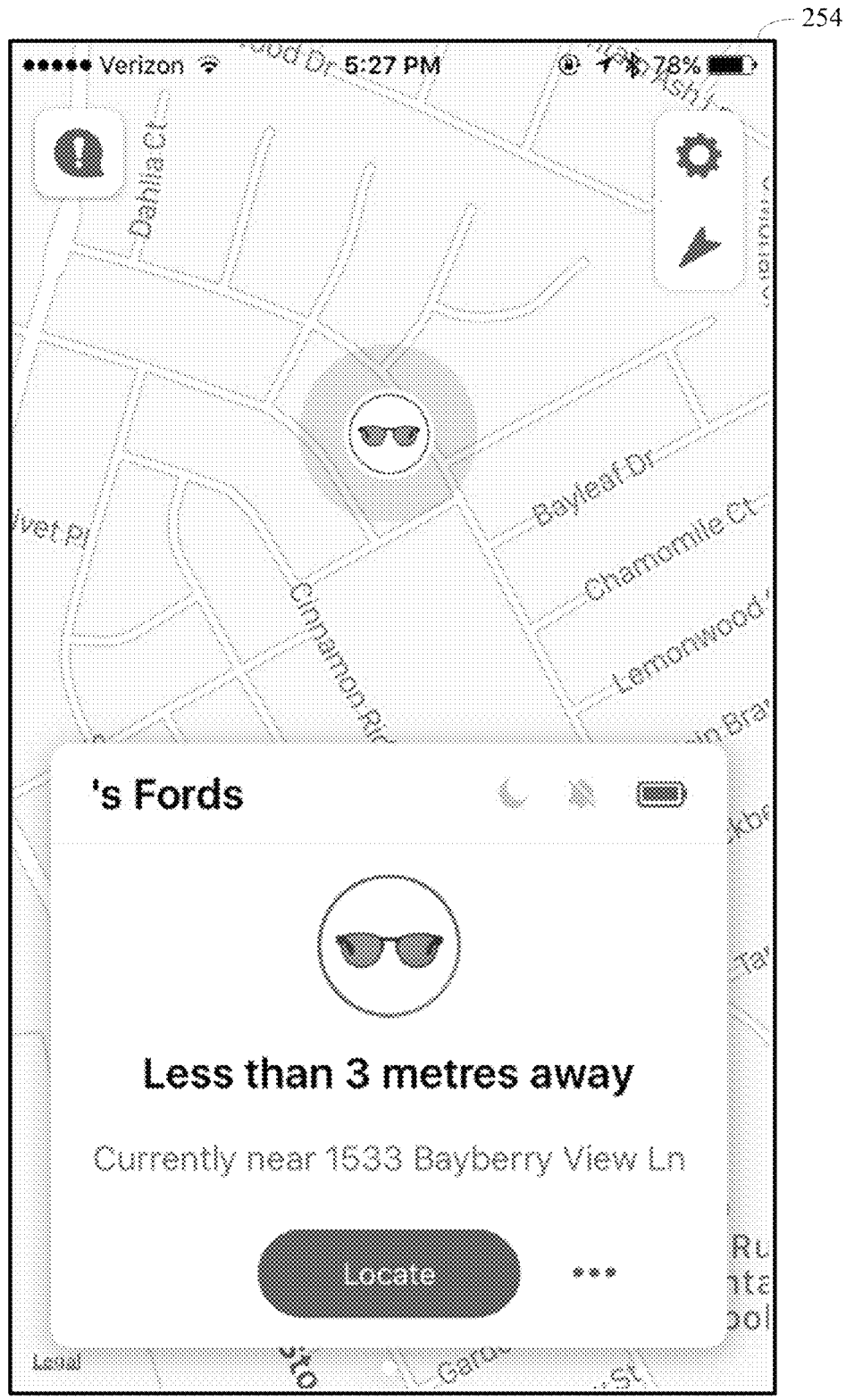
FIG. 15 illustrates how a target object is pinpointed on a map on a display of a portable computer system together with an approximate distance between the portable computer system and the target object using an object tracking module operating on the portable computer system in accordance with an embodiment of the present disclosure, where the distance between the portable computer system and the target object is now closer than it was in FIG. 14.

Referring to block 430, responsive to failing to detect the object 104 using the wireless communication protocol, the method further comprises posting on the display 254 a location of the object 104 on a map centered using the last known GPS coordinates 226 of the object. Moreover, referring to block 432 of FIG. 4C, responsive to failing to detect the object 104 using the wireless communication protocol, on a recurring basis, a procedure is performed that comprises: (i) calculating a distance between portable computer system 102 and the object 104 using the present GPS coordinates of the portable computer system 102 based on the last known GPS coordinates 226 of the object 104 and (ii) displaying the distance on the display 254. This is illustrated in FIGS. 14 and 15 where it is seen that between the instance of FIG. 14 and the instance of FIG. 15, the distance 224 between the object 104 and the portable computer system 102 decreased.

Block 434.

Figure 4D:
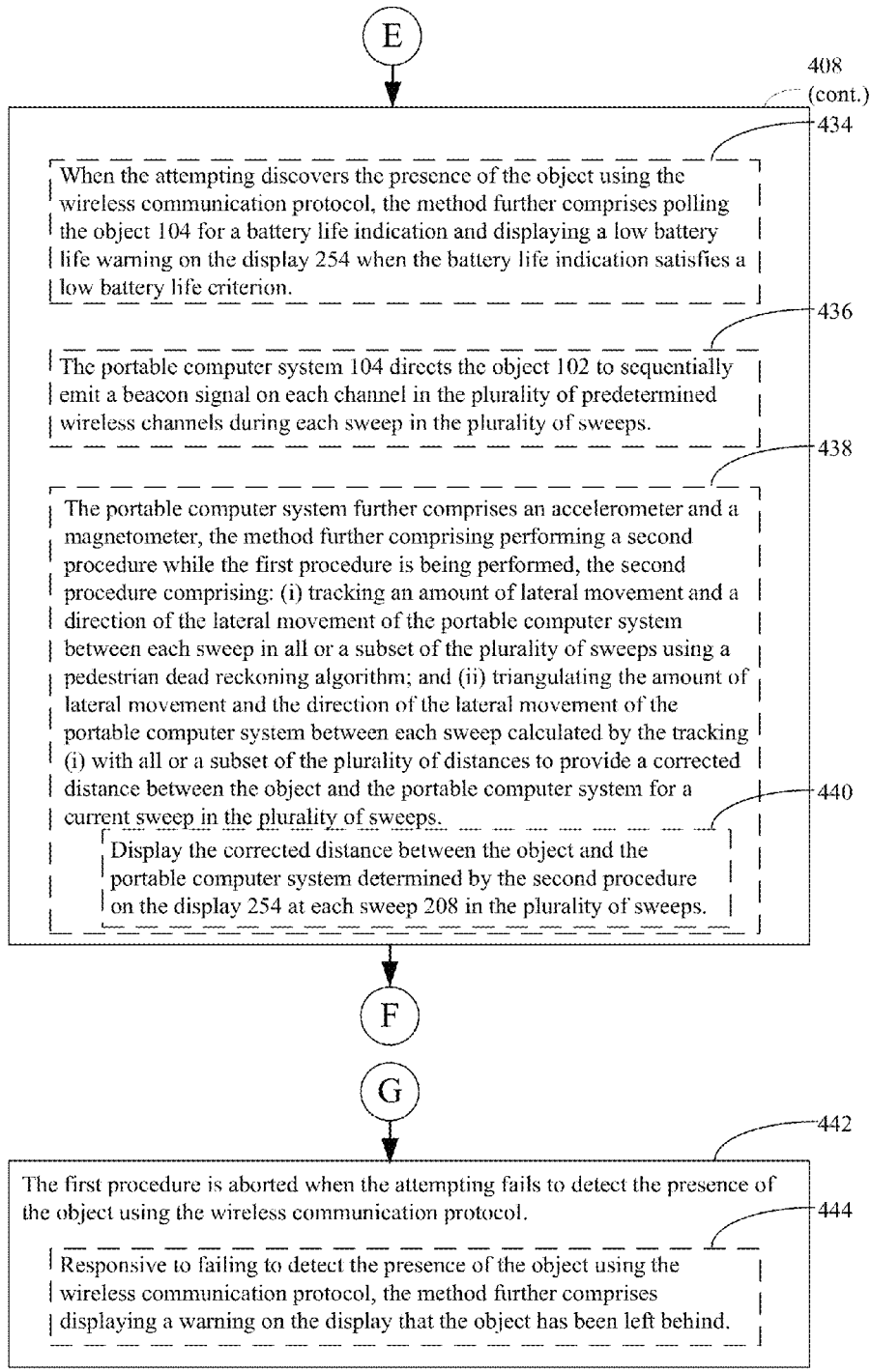

Referring to block 434 of FIG. 4D, in some embodiments when the attempting of block 404 (406—Yes) discovers the presence of the object 104 using the wireless communication protocol, the method further comprises polling the object 104 (e.g., the power indication module 304 of object 104 as illustrated in FIG. 3) for a battery life indication and displaying a low battery life warning on the display 254 when the battery life indication satisfies a low battery life criterion.

Block 436.

Referring to block 436 of FIG. 4D, in some embodiments the portable computer system 104 directs the object 102 to sequentially emit a beacon signal on each channel 206 in the plurality of predetermined wireless channels during each sweep 208 in the plurality of sweeps.

Blocks 438-440.

Referring to block 438 of FIG. 4D, in some embodiments the portable computer system 102 further comprises an accelerometer and a magnetometer 250, and the method further comprises performing a second procedure while the first procedure is being performed. In such embodiments, the second procedure comprises: (i) tracking an amount of lateral movement and a direction of the lateral movement of the portable computer system 102 between each sweep 208 in all or a subset of the plurality of sweeps using a pedestrian dead reckoning algorithm of the pedestrian dead reckoning module 238 and (ii) triangulating the amount of lateral movement and the direction of the lateral movement of the portable computer system 102 between each sweep 208 calculated by the tracking (i) with all or a subset of the plurality of distances to provide a corrected distance between the object 104 and the portable computer system 102 for a current sweep 208 in the plurality of sweeps. Referring to block 440, in some such embodiments the corrected distance determined by the second procedure between the object 104 and the portable computer system 102 is displayed on the display 254 at each sweep in the plurality of sweeps. See Kwanmuang, 2015 "Filtering and Tracking for a Pedestrian Dead-Reckoning System," Ph.D. Dissertation, The University of Michigan, which is hereby incorporated by reference, for exemplary disclosure on pedestrian dead reckoning algorithm.

Blocks 442-444.

Figure 19:
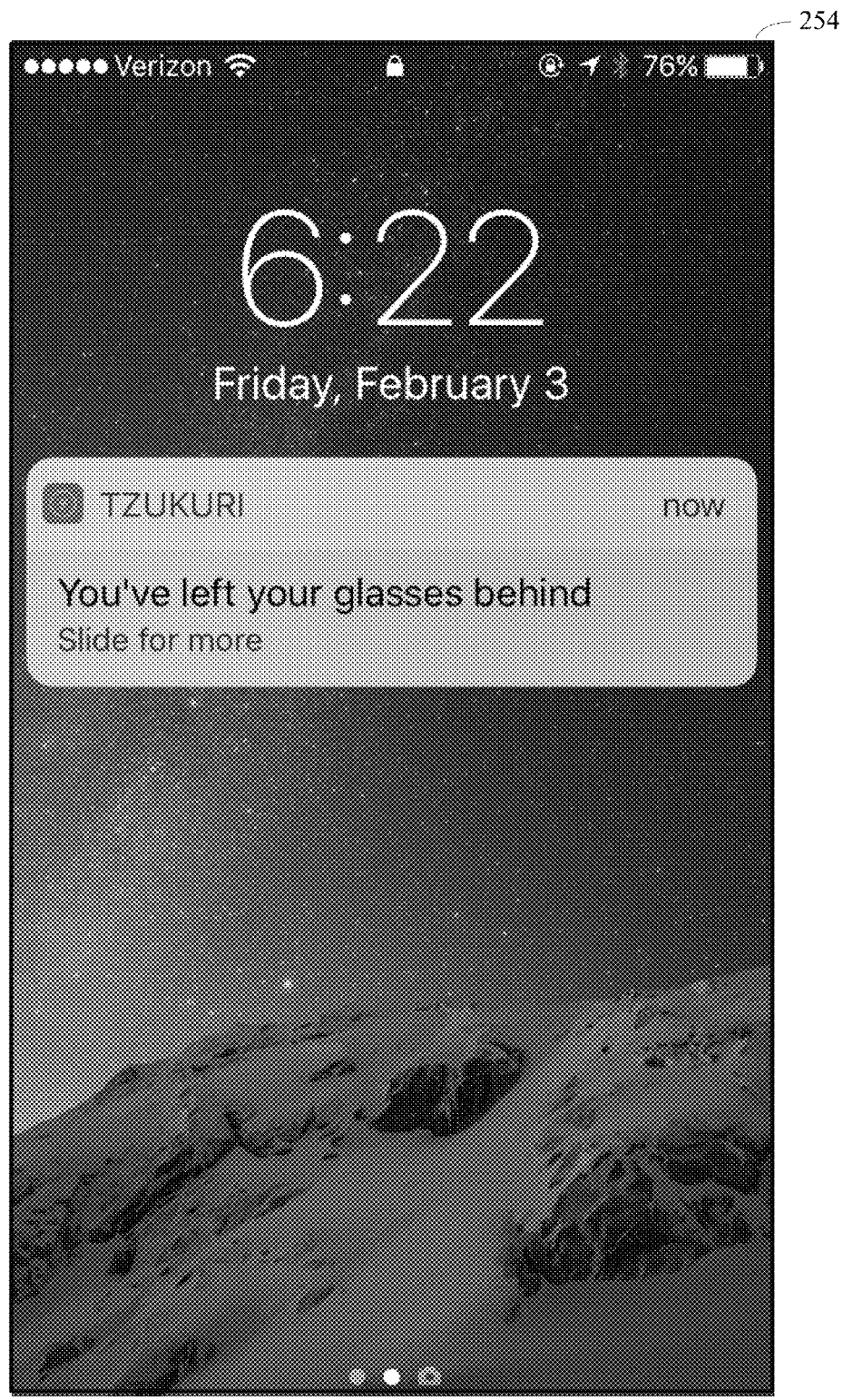
FIG. 19 illustrates how, responsive to failing to detect the presence of an object using a wireless communication protocol, an object tracking module operating on a portable computer system displays a warning that the object has been left behind in accordance with an embodiment of the present disclosure.

Referring to block 442 of FIG. 4D, the first procedure is aborted when the attempting of block 404 fails to detect the presence of the object 104 using the wireless communication protocol (406—No). In some such embodiments, responsive to failing to detect the presence of the object 104 using the wireless communication protocol, the method further comprises displaying a warning on the display 254 that the object 104 has been left behind. This is illustrated in FIG. 19.

Blocks 446-450.

Figure 20:
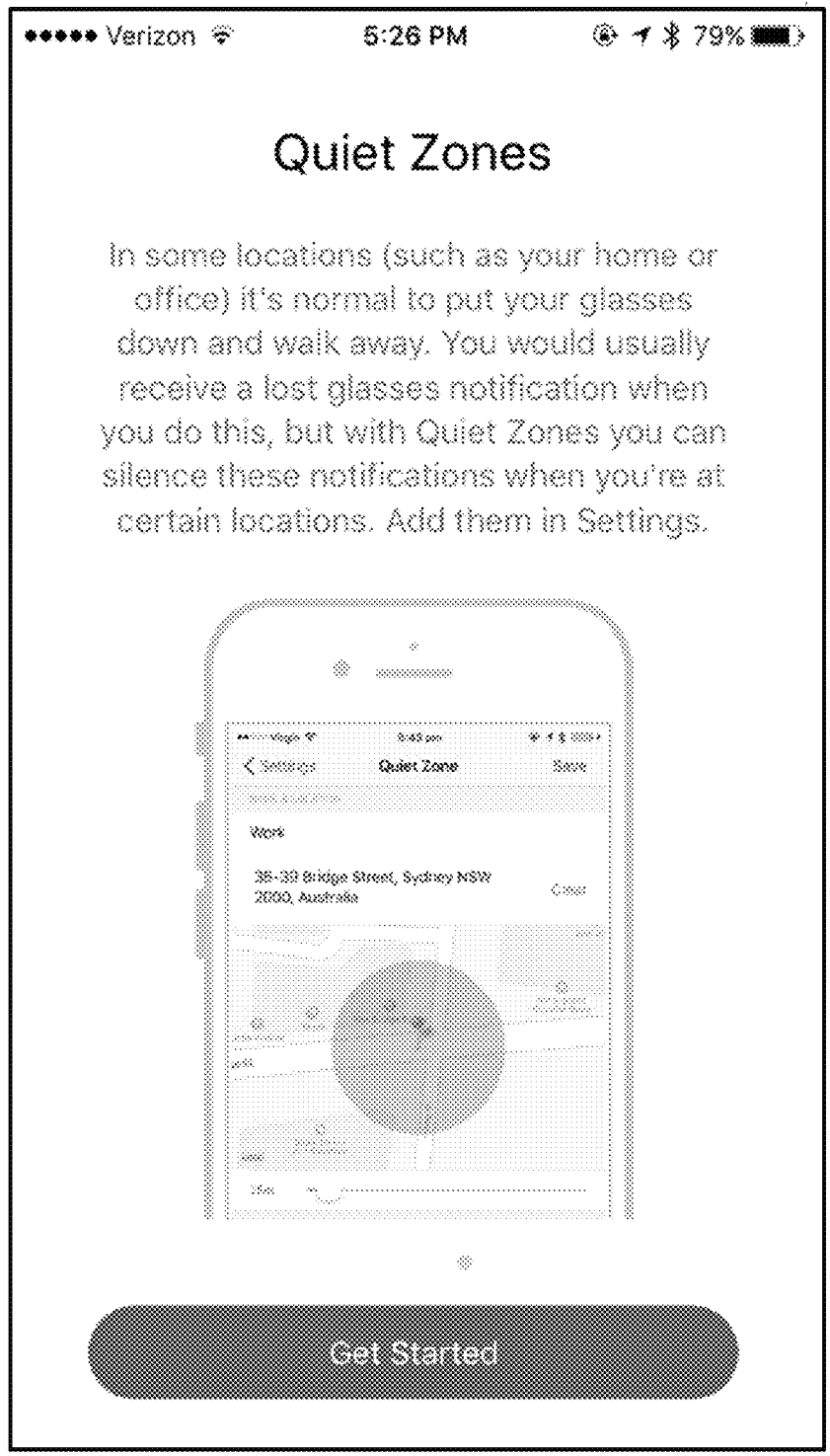
FIG. 20 illustrates a feature of an object tracking module operating on a portable computer system of cataloging each respective location in a plurality of locations using a combination of (i) a magnetic footprint taken by a magnetometer while the portable computer system is at the respective location and (ii) a corresponding label for the respective location provided by a user of the portable computer system thereby forming a catalog of locations, and where an identification is received that all or a subset of the plurality of the locations are quiet zones in accordance with an embodiment of the present disclosure.

Referring to block 446 of FIG. 4E, and FIGS. 21 through 23, in some embodiments the portable computer system 102 further comprises a magnetometer, and the method further comprises performing a second procedure. In such embodiments, the second procedure comprises cataloging each respective location 232 in a plurality of locations using a combination of (i) a magnetic footprint taken by the magnetometer while the portable computer system 102 is at the respective location and (ii) a corresponding label 234 for the respective location provided by a user of the portable computer system 102 thereby forming a catalog of locations (e.g., magnetometer reading library 230), receiving an identification that all or a subset of the plurality of the locations are quiet zones, and obtaining a magnetometer reading using the magnetometer on a recurring basis while the first procedure is performed. This feature is described to a user of the portable computer system by the object tracking module 204 in FIG. 20. As noted there, in some locations (such as the user's home or office) it is normal to put the object 104 down and walk away. The user typically would not want to receive a lost object 104 notification when this occurs. By designating quiet zones such locations are suppressed. Such embodiments take advantage of the unique magnetometer fingerprint specific locations indoors have. Such footprints tend to be stable and thus can be used as a basis for cataloging locations indoors (e.g., master bedroom, kitchen, office, etc.).

Figure 21:
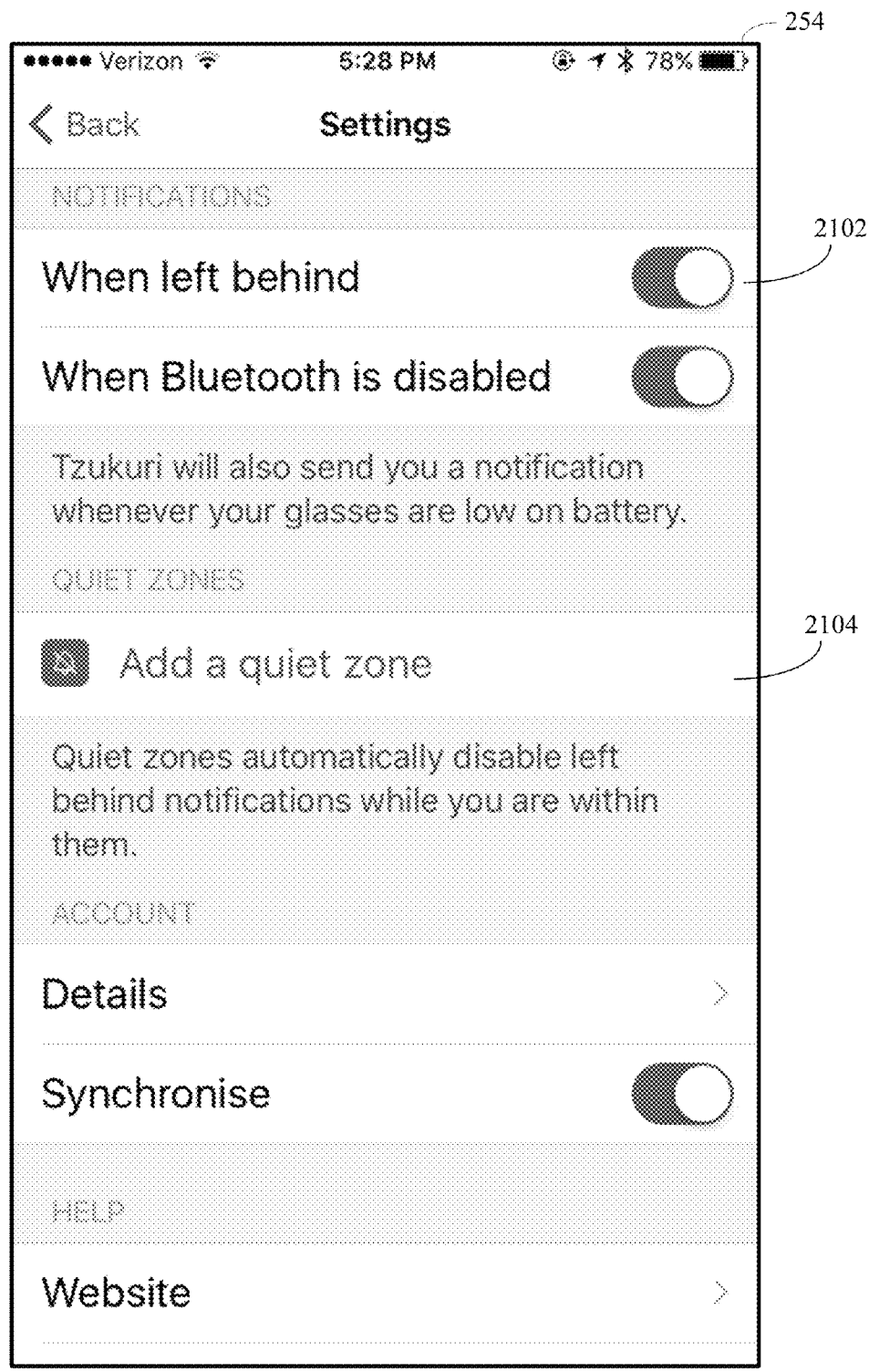
FIG. 21 illustrates options provided by the object tracking module of FIG. 20 for specifying action taken when an object is left behind and for adding quiet zones, in accordance with an embodiment of the present disclosure.
Figure 22:
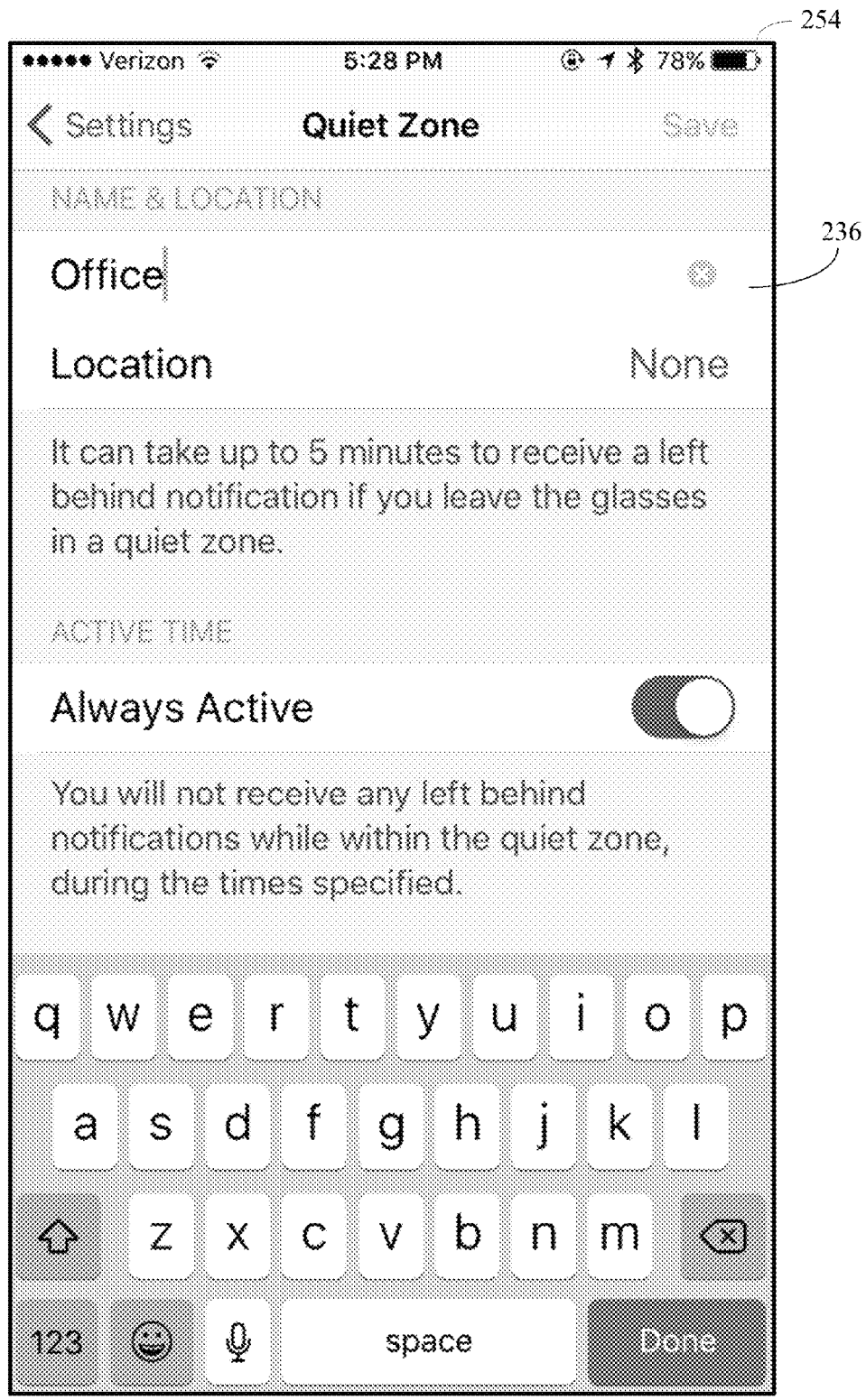
FIG. 22 illustrates receiving a label for a corresponding location in the catalog of locations of FIG. 20 through the object tracking module on the portable computer device in accordance with an embodiment of the present disclosure.
Figure 23:
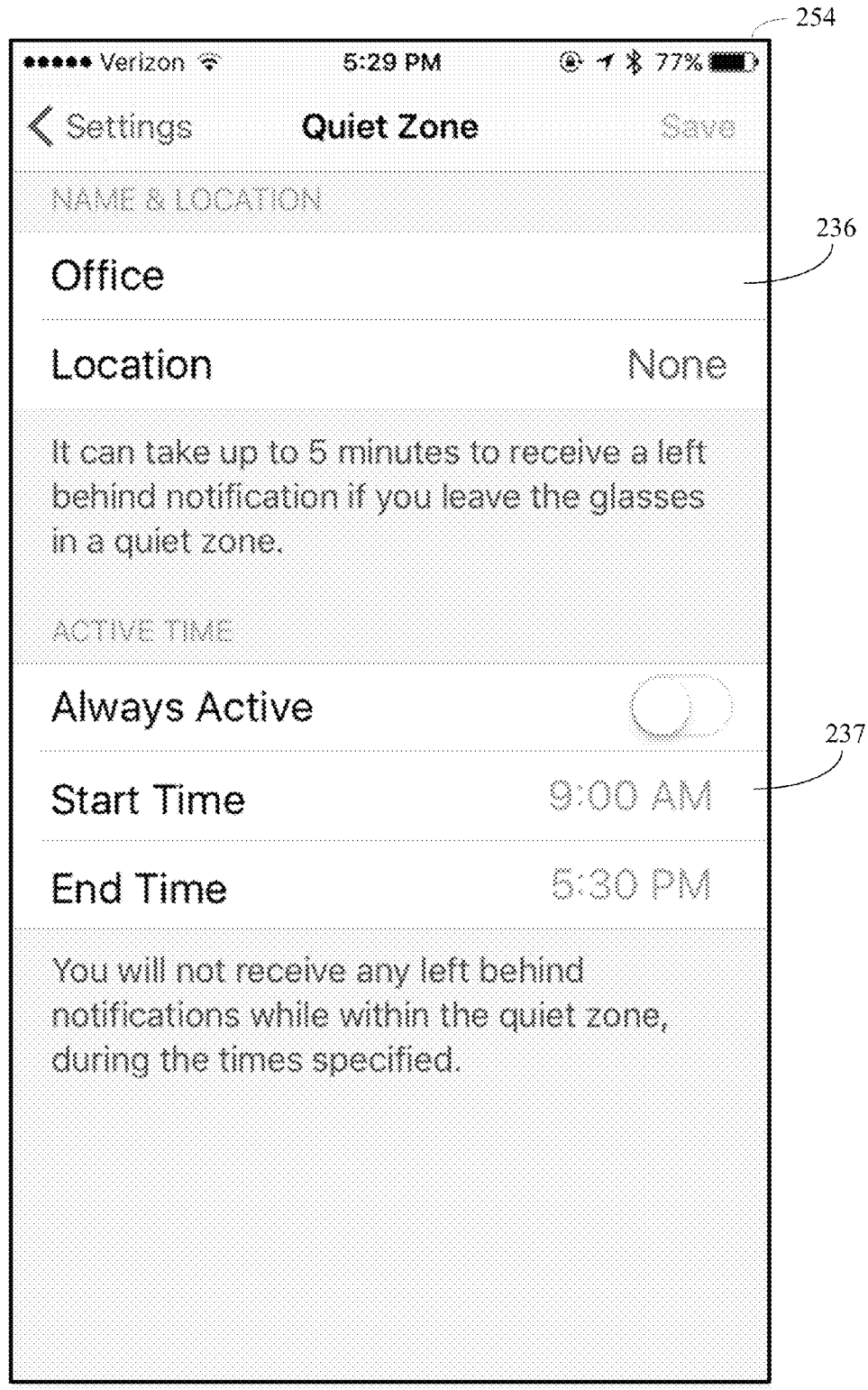
FIG. 23 illustrates determination of quiet zone parameters in accordance with an embodiment of the present disclosure.
Figure 24:
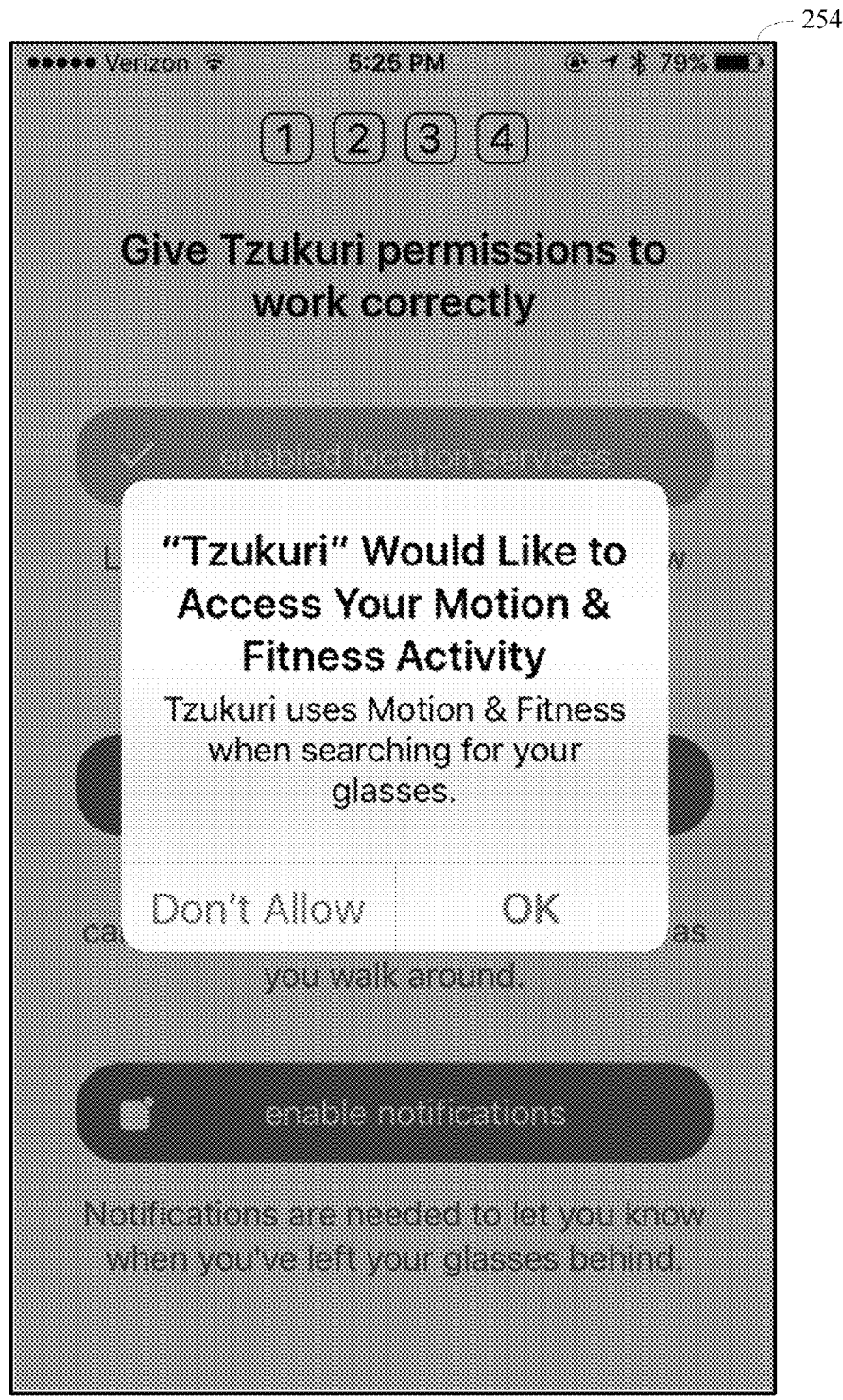
FIG. 24 illustrates a notice provided in order to access device hardware need to perform dead reckoning in accordance with an embodiment of the present disclosure.

FIG. 21 details how a user can use affordance 2102 to trigger an alert on the portable computer system 102 when the user has left the object 104 behind. FIG. 21 further details how a user can use affordance 2104 to add a quiet zone 232. When the user request to add a quiet zone (location 232), in some embodiments, the object tracking module 204 displays the panel illustrated in FIG. 22, where the user is asked to provide a label 236 for the quiet zone. The object tracking module 204 also takes a magnetometer reading for the location 232 that serves as the magnetometer reading 234 for the location 232 (quiet zone). In some such embodiments, in order to create a magnetometer reading 234 for the location 232, the object tracking module 204 creates a series of tree classifiers that take as input a processed form of the 3-axis magnetometer and accelerometer vectors acquired by the portable computer system 102 stored, for example, in the following construct:

```
class MagnetometerSample {
/// raw Z axis value from the magnetometer
let Z: Double
/// magnitude of the magnetometer vector (sqrt [x^2+y^+
    z^])
let mag: Double
/// cosine angle between the magnetometer vector and
/// accelerometer gravity vector
let cos: Double
}
```

As output the classifier returns a probability for each location 232. For example, if there are four classified rooms (four classified quiet zones), the classifier returns a vector of four numbers which sum to 1.0, e.g. [0.2, 0.1, 0.1, 0.6]. In some embodiments, a forest of tree classifiers is used and the classification is repeated in each tree, and the result is averaged over each location 232. In some embodiments each location 232 is a separate room. The object tracking module 204 then picks the room (quiet zone/location 232) with the highest probability. For disclosure on forest of tree classifiers used in accordance with one such embodiment of the present disclosure, see Geurts et al., 2006. "Extremely randomized trees," Machine Learning 63, p. 3, which is hereby incorporated by reference. Various ways are used to decide when there is no location 232 (null classification, e.g. someone is standing in a room that has not been classified as a quiet zone).

Referring to block 448, in some such embodiments, responsive to failing to detect the presence of the object 104 using the wireless communication protocol, the method further comprises seeking to identify the present location of the object 104 by comparing a most recent magnetometer reading taken by the second procedure to one or more magnetometer readings in the catalog of locations. Advantageously, when the present location of the object is localized, by the seeking, to a location in the catalog that is designated as a quiet zone, no warning is displayed regarding the location of the object. When the present location of the object is localized, by the seeking, to a location in the catalog 230 that is not designated as a quiet zone, a warning is displayed (e.g., on the display 254) regarding the location of the object 104. When the present location of the object is not localized, by the seeking, to a location in the catalog, a warning is displayed (e.g., on the display 254) regarding the location of the object.

Referring to block 450, alternatively, in some such embodiments the second procedure further comprises receiving instructions from a user of the portable computer system 102 to independently assign each quiet zone in the catalog 230 a corresponding quiet zone period 237. Responsive to failing to detect the presence of the object 104 using the wireless communication protocol, the method further comprises seeking to identify the present location of the object 104 by comparing a most recent magnetometer reading taken by the second procedure to magnetometer readings in the catalog of locations (e.g., magnetometer reading library 230). When the present location of the object is localized, by the seeking, to a first location in the catalog that is designated as a quiet zone within the quiet zone period 237 for the first location, no warning is displayed regarding the location of the object. When the present location of the object 104 is localized, by the seeking, to a first location in the catalog 230 that is designated as a quiet zone outside the quiet zone period for the first location, a warning is displayed regarding the location of the object 104. When the present location of the object 104 is localized, by the seeking, to a first location in the catalog 230 that is not designated as a quiet zone or the attempting fails to identify the present location of the object, a warning is displayed (e.g., on the display 254) regarding the location of the object.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIG. 2 or 3 and/or described in FIG. 4. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A method for tracking an object, the method comprising:
    at a portable computer system comprising one or more processors, a memory, a display, and a receiver:
    attempting to detect a presence of the object using a wireless communication protocol, wherein
        while the attempting detects the presence of the object using the wireless communication protocol, the method further comprises performing a first procedure at each respective sweep in a plurality of sweeps, the first procedure comprising:
    polling a plurality of predetermined wireless channels sequentially pulsed by the object, using the receiver, thereby obtaining a plurality of signal measurements, each respective signal measurement in the plurality of signal measurements corresponding to a channel in the plurality of wireless channels,
    filtering, for each respective predetermined wireless channel in the plurality of wireless channels, the respective signal measurement obtained in the respective sweep, against signal measurements obtained for the respective wireless channel from prior sweeps in the plurality of sweeps by the polling, thereby obtaining a plurality of filtered signal measurements, each filtered signal measurement in the plurality of filtered signal measurements for a corresponding wireless channel in the plurality of wireless channels,
    eliminating one or more filtered signal measurements, in the plurality of filtered signal measurements, from the plurality of filtered signal measurements when each filtered signal measurement in the one or more filtered signal measurements satisfies an outlier criterion,
    determining, after the eliminating, a first value that is representative of a measure of central tendency of the plurality of filtered signal measurements, and
    converting the first value to a distance between the object and the portable computer system for the respective sweep using a path loss function, thereby determining a plurality of distances, each distance in the plurality of distances corresponding to a sweep in the plurality of sweeps, wherein
    the first procedure is aborted when the attempting fails to detect the presence of the object using the wireless communication protocol.

2. The method of claim 1, the method further comprising displaying the distance between the object and the portable computer system on the display determined by the first procedure at each sweep in the plurality of sweeps.

3. The method of claim 1, wherein the first procedure is performed while the portable computer system is in motion and the object is stationary.

4. The method of claim 1, wherein the eliminating comprises running a Chebyshev outlier detection on the plurality of filtered signal measurements to determine whether one or more filtered signal measurements in the plurality of filtered signal measurements satisfy the outlier criterion.

5. The method of claim 1, wherein the path loss function is:

$$RSSI = -10n\log_{10}\left(\frac{d}{d_o}\right) + A_o$$

wherein,
- RSSI is the first value in units of dBm,
- d is the distance between the object and the portable computer system,
- $d_o$ is a reference distance between the object and the portable computer system,
- n is a propagation constant or path-loss exponent, and
- $A_o$ is a referenced RSSI value at $d_o$.

6. The method of claim 1, wherein the plurality of predetermined wireless channels are Bluetooth low energy wireless channels.

7. The method of claim 1, wherein the plurality of predetermined wireless channels are Bluetooth channels, ZigBee channels, or WiFi channels.

8. The method of claim 1, wherein the plurality of predetermined wireless channels are Bluetooth channels.

9. The method of claim 1, wherein the plurality of predetermined wireless channels are ZigBee channels.

10. The method of claim 1, wherein the attempting is initiated responsive to a user request at the portable computer system to locate the object.

11. The method of claim 1, wherein the portable computer system further comprises a global positioning device, wherein
responsive to detecting the presence of the object using the wireless communication protocol, the method further comprises:
obtaining the global position system coordinates of the portable system; and
storing the global position system coordinates of the portable system as the last known global position system coordinates of the object.

12. The method of claim 11, wherein
responsive to failing to detect the presence of the object using the wireless communication protocol, the method further comprises:
posting on the display a location of the object on a map that is centered based upon the last known global position system coordinates of the object.

13. The method of claim 11,
responsive to failing to detect the presence of the object using the wireless communication protocol, the method further comprises on a recurring basis:
calculating a distance between the portable computer system and the object using the present global position system coordinates of the portable computer system obtained using the global positioning device and the last known global position system coordinates of the object; and
displaying the distance.

14. The method of claim 1, wherein
responsive to failing to detect the presence of the object using the wireless communication protocol, the method further comprises:
displaying a warning on the display that the object has been left behind.

15. The method of claim 1, wherein the portable computer system further comprises a magnetometer, the method further comprising:
performing a second procedure, the second procedure comprising cataloging each respective location in a plurality of locations using a combination of (i) a magnetic footprint taken by the magnetometer while the portable computer system is at the respective location and (ii) a corresponding label for the respective location provided by a user of the portable computer system thereby forming a catalog of locations;
receiving an identification that all or a subset of the plurality of the locations are quiet zones; and
obtaining a magnetometer reading using the magnetometer on a recurring basis while the first procedure is performed.

16. The method of claim 15, wherein
responsive to failing to detect the presence of the object using the wireless communication protocol, the method further comprises:
seeking to identify the present location of the object by comparing a most recent magnetometer reading taken by the second procedure to one or more magnetometer readings in the catalog of locations; wherein
when the present location of the object is localized, by the seeking, to a location in the catalog that is designated as a quiet zone, no warning is displayed regarding the location of the object,
when the present location of the object is localized, by the seeking, to a location in the catalog that is not designated as a quiet zone, a warning is displayed regarding the location of the object, and
when the present location of the object is not localized, by the seeking, to a location in the catalog, a warning is displayed regarding the location of the object.

17. The method of claim 15, wherein
the second procedure further comprises receiving instructions from a user of the portable computer system to independently assign each quiet zone in the catalog a corresponding quiet zone period;
responsive to failing to detect the presence of the object using the wireless communication protocol, the method further comprises:
seeking to identify the present location of the object by comparing a most recent magnetometer reading taken by the second procedure to magnetometer readings in the catalog of locations: wherein
when the present location of the object is localized, by the seeking, to a first location in the catalog that is designated as a quiet zone within the quiet zone period for the first location, no warning is displayed regarding the location of the object,
when the present location of the object is localized, by the seeking, to a first location in the catalog that is designated as a quiet zone outside the quiet zone period for the first location, a warning is displayed regarding the location of the object,
when the present location of the object is localized, by the seeking, to a first location in the catalog that is not designated as a quiet zone or the attempting fails to identify the present location of the object, a warning is displayed regarding the location of the object.

18. The method of claim 1, the method further comprising:

when the attempting discovers the presence of the object using the wireless communication protocol, the method further comprises:

polling the object for a battery life indication, and displaying a low battery life warning on the display when the battery life indication satisfies a low battery life criterion.

19. The method of claim 1, wherein the portable computer system further comprises an accelerometer and a magnetometer, the method further comprising performing a second procedure while the first procedure is being performed, the second procedure comprising:

(i) tracking an amount of lateral movement and a direction of the lateral movement of the portable computer system between each sweep in all or a subset of the plurality of sweeps using a pedestrian dead reckoning algorithm; and (ii) triangulating the amount of lateral movement and the direction of the lateral movement of the portable computer system between each sweep calculated by the tracking (i) with all or a subset of the plurality of distances to provide a corrected distance between the object and the portable computer system for a current sweep in the plurality of sweeps.

20. The method of claim 19, the method further comprising displaying the corrected distance between the object and the portable computer system on the display determined by the second procedure at each sweep in the plurality of sweeps.

21. The method of claim 1, wherein the portable computer system directs the object to sequentially emit a beacon signal on each channel in the plurality of predetermined wireless channels during each sweep in the plurality of sweeps.

22. The method of any one of claims 1-21, wherein the object is a pair of glasses.

23. A computer system, comprising:

one or more processors;

memory;

a receiver in electrical communication with the one or more processor; and one or more programs, wherein the one or more programs are stored in the memory and configured to be executed by the one or more processors, the one or more programs including instructions for:

attempting to detect a presence of an object using a wireless communication protocol, wherein while the attempting detects the presence of the object using the wireless communication protocol, the one or more programs further include instructions for performing a first procedure at each respective sweep in a plurality of sweeps, the first procedure comprising:

polling a plurality of predetermined wireless channels sequentially pulsed by the object, using the receiver, thereby obtaining a plurality of signal measurements, each respective signal measurement in the plurality of signal measurements corresponding to a channel in the plurality of wireless channels, filtering, for each respective predetermined wireless channel in the plurality of wireless channels, the respective signal measurement obtained in the respective sweep, against signal measurements obtained for the respective wireless channel from prior sweeps in the plurality of sweeps by the polling, thereby obtaining a plurality of filtered signal measurements, each filtered signal measurement in the plurality of filtered signal measurements for a corresponding wireless channel in the plurality of wireless channels, eliminating one or more filtered signal measurements, in the plurality of filtered signal measurements, from the plurality of filtered signal measurements when each filtered signal measurement in the one or more filtered signal measurements satisfies an outlier criterion, determining, after the eliminating, a first value that is representative of a measure of central tendency of the plurality of filtered signal measurements, and converting the first value to a distance between the object and the portable computer system for the respective sweep using a path loss function, thereby determining a plurality of distances, each distance in the plurality of distances corresponding to a sweep in the plurality of sweeps, wherein the first procedure is aborted when the attempting fails to detect the presence of the object using the wireless communication protocol.

24. A non-transitory computer readable storage medium and one or more computer programs embedded therein, the one or more computer programs comprising instructions, which when executed by a computer system, cause the computer system to execute a method comprising:

attempting to detect a presence of the object using a wireless communication protocol, wherein while the attempting detects the presence of the object using the wireless communication protocol, the method further comprises performing a first procedure at each respective sweep in a plurality of sweeps, the first procedure comprising:

polling a plurality of predetermined wireless channels sequentially pulsed by the object, using a receiver, thereby obtaining a plurality of signal measurements, each respective signal measurement in the plurality of signal measurements corresponding to a channel in the plurality of wireless channels, filtering, for each respective predetermined wireless channel in the plurality of wireless channels, the respective signal measurement obtained in the respective sweep, against signal measurements obtained for the respective wireless channel from prior sweeps in the plurality of sweeps by the polling, thereby obtaining a plurality of filtered signal measurements, each filtered signal measurement in the plurality of filtered signal measurements for a corresponding wireless channel in the plurality of wireless channels, eliminating one or more filtered signal measurements, in the plurality of filtered signal measurements, from the plurality of filtered signal measurements when each filtered signal measurement in the one or more filtered signal measurements satisfies an outlier criterion, determining, after the eliminating, a first value that is representative of a measure of central tendency of the plurality of filtered signal measurements, and converting the first value to a distance between the object and the portable computer system for the respective sweep using a path loss function, thereby determining a plurality of distances, each distance in the plurality of distances corresponding to a sweep in the plurality of sweeps, wherein the first procedure is aborted when the attempting fails to detect the presence of the object using the wireless communication protocol.

\* \* \* \* \*